(12) United States Patent
Knights et al.

(10) Patent No.: US 12,021,394 B2
(45) Date of Patent: Jun. 25, 2024

(54) TOY SYSTEM HAVING A CONTACTLESS ENERGY TRANSFER SYSTEM

(71) Applicant: LEGO A/S, Billund (DK)

(72) Inventors: Andrew James Knights, Cambridgeshire (GB); Isobel Jane Ashbey, Cambridge (GB); Rosanna Elizabeth Parrish, Cambridge (GB); Simon Mark Jordan, Upper Cambourne (GB); Robert George Milner, Cambridgeshire (GB); Martin Edward Brock, Cambridge (GB); Thomas Alan Donaldson, Billund (DK); Mark Ross Champkins, Billund (DK); Radost Radoslavova Kerefeyna, Billund (DK); Rasmus Bissenbakker Kærsgaard, Billund (DK); Yufan Wei Wang, Billund (DK); Troels Hermann, Billund (DK); Arun Venkatasubramanian, Singapore (SG)

(73) Assignee: LEGO A/S, Billund (DK)

( * ) Notice: Subject to any disclaimer, the term of this patent is extended or adjusted under 35 U.S.C. 154(b) by 432 days.

(21) Appl. No.: 17/426,980

(22) PCT Filed: Dec. 12, 2019

(86) PCT No.: PCT/EP2019/084808
§ 371 (c)(1),
(2) Date: Jul. 29, 2021

(87) PCT Pub. No.: WO2020/156721
PCT Pub. Date: Aug. 6, 2020

(65) Prior Publication Data
US 2022/0247218 A1 Aug. 4, 2022

(30) Foreign Application Priority Data

Jan. 31, 2019 (DK) .............................. PA201970075
Jan. 31, 2019 (DK) .............................. PA201970077

(51) Int. Cl.
*H02J 50/12* (2016.01)
*H02J 7/00* (2006.01)
(Continued)

(52) U.S. Cl.
CPC .......... *H02J 50/402* (2020.01); *H02J 7/0042* (2013.01); *H02J 7/0063* (2013.01); *H02J 7/0068* (2013.01);
(Continued)

(58) Field of Classification Search
CPC ...... H02J 50/402; H02J 7/0042; H02J 7/0063; H02J 7/0068; H02J 50/12; H02J 50/80;
(Continued)

(56) References Cited

U.S. PATENT DOCUMENTS 9,061,216 B1  6/2015  Hooper et al.
2010/0127660 A1  5/2010  Cook et al.
(Continued)

FOREIGN PATENT DOCUMENTS

CN   102360686 A   2/2012
CN   105611975 A   5/2016
(Continued)

OTHER PUBLICATIONS

International Search Report issued in corresponding international patent application No. PCT/EP2019/084808, dated Feb. 4, 2020, 4 pages.
(Continued)

*Primary Examiner* — Paul Dinh
(74) *Attorney, Agent, or Firm* — Day Pitney LLP; George Chaclas; Anthony A. Kassas

(57) ABSTRACT

A toy system comprising a plurality of toy construction elements, having detachably interconnecting coupling members for creating coherent spatial structures. The plurality of toy construction elements include: an energy source device comprising a housing and an energy transfer circuit therein; and energy distribution devices to provide respective external conductive loops extending outside the housing and defining a respective external energy transfer zone in a proximity of the respective external conductive loops. The energy source device is configured to be brought into operational connection with the energy distribution devices. The energy transfer circuit is configured to receive electrical energy from an energy source and, when the energy source device is in operational connection with a first energy distribution device, to energize the external conductive loops creating a time-varying electromagnetic field in an external energy transfer zone defined by the first energy distribution device in a proximity of the external conductive loops.

28 Claims, 17 Drawing Sheets

(51) Int. Cl.
*H02J 50/40* (2016.01)
*H02J 50/80* (2016.01)
*A63H 33/04* (2006.01)

(52) U.S. Cl.
CPC .............. *H02J 50/12* (2016.02); *H02J 50/80* (2016.02); *A63H 33/042* (2013.01)

(58) Field of Classification Search
CPC ...... H02J 50/10; H02J 7/342; H02J 13/00022; H02J 50/40; A63H 33/042; A63H 33/04
USPC ......................................................... 320/108
See application file for complete search history.

(56) References Cited

U.S. PATENT DOCUMENTS

| | | | |
|---|---|---|---|
| 2010/0311300 | A1 | 12/2010 | Hansen et al. |
| 2011/0018360 | A1 | 1/2011 | Baarman et al. |
| 2013/0217294 | A1 | 8/2013 | Karunaratne |
| 2013/0217295 | A1 | 8/2013 | Karunaratne |
| 2014/0021798 | A1 | 1/2014 | Kesler et al. |
| 2015/0137732 | A1* | 5/2015 | Lai .......................... H02J 50/80 |
| | | | 320/108 |
| 2015/0283470 | A1 | 10/2015 | Hooper et al. |
| 2016/0296849 | A9 | 10/2016 | Paulson et al. |
| 2018/0236368 | A1 | 8/2018 | Chen et al. |
| 2023/0178998 | A1* | 6/2023 | Zeine ...................... H02J 50/12 |
| | | | 320/108 |

FOREIGN PATENT DOCUMENTS

| | | |
|---|---|---|
| CN | 105641946 A | 6/2016 |
| CN | 105709435 B | 6/2016 |
| CN | 205516505 U | 8/2016 |
| CN | 206161712 U | 5/2017 |
| CN | 107185259 A | 9/2017 |
| CN | 108754590 A | 11/2018 |
| CN | 109126164 A | 1/2019 |
| CN | 113613749 A | 11/2021 |
| EP | 3129109 A2 | 2/2017 |
| TW | M518582 U | 3/2016 |
| WO | 2016/055862 A1 | 4/2016 |
| WO | 2018/124342 A1 | 7/2018 |

OTHER PUBLICATIONS

Written Opinion of the International Searching Authority issued in corresponding international patent application No. PCT/EP2019/084808, dated Feb. 4, 2020, 8 pages.
First Technical Examination Report from priority Danish patent application No. PA 201970077, dated Aug. 7, 2019, 10 pages.
First Technical Examination Report from priority Danish patent application No. PA 201970075, issued Sep. 18, 2019, 14 pages.
First Office Action issued in corresponding Chinese Patent Application No. 201980090781.9, dated May 7, 2022, 10 pages (English translation only).

* cited by examiner

TOY SYSTEM HAVING A CONTACTLESS ENERGY TRANSFER SYSTEM

CROSS-REFERENCE TO RELATED APPLICATIONS

This application is a U.S. National Stage of International Application No. PCT/EP2019/084808, filed on 12 Dec. 2019 and published on 6 Aug. 2020, as WO2020/156721, which claims the benefit of priority to Danish Patent Application No. PA 2019 70075, filed on 31 Jan. 2019 and Danish Patent Application No. PA 2019 70077, filed on 31 Jan. 2019. The content of each of the above referenced patent applications is incorporated herein by reference in its entirety for any purpose whatsoever.

TECHNICAL FIELD

The present disclosure relates to a toy system comprising a contactless energy transfer system such as a contactless charging system.

BACKGROUND

Contactless charging of electronic devices is a convenient technology as it is easy to use for the user, avoids the need for wired connections between a charger and the electronic device to be charged, etc.

Examples of electronic devices include electronic toys such as battery-powered electronic toys. It is thus desirable to provide a convenient system for transferring electrical power to electronic toys U.S. Pat. No. 8,841,845 discloses an induction-based lighting system designed to provide power to model displays and other similar applications. The first part of the system is the wireless power mat that is placed under the model houses and used as the base for the village, and contains a primary winding that interacts with secondary windings placed inside display components to provide lighting effects, such as one finds in model Christmas villages. The electrical characteristics of the primary winding can be controlled by a microcontroller to make lights in the models blink or change as a user desires.

CN utility model no. 205516505U discloses a toy having a number of separate interactive function modules each comprising a re-chargeable battery and an inductive charging circuitry adapted for charging the modules. The toy also comprises a base forming a number of separate transmitting induction coils mutually arranged at a distance from each other so that each module may be placed upon each one of the separate induction coils for charging the module. When the function modules are all charged, then they may be used away from the charging base, until they are discharged and therefore needs recharging Nevertheless, it remains desirable to provide an improved contactless energy transfer system, such as a more user-friendly and/or more flexible system.

On this background, it is also desirable to provide a toy providing the user the option of easy recharging a product, such as a toy product, comprising two or more separate functions.

SUMMARY

Disclosed herein are aspects of a toy system comprising a contactless energy transfer system and, in particular, a contactless charging system.

According to a first aspect, embodiments of a toy system comprise a plurality of toy construction elements, each toy construction element comprising coupling members for detachably interconnecting the toy construction elements with each other to create one or more coherent spatial structures; wherein the plurality of toy construction elements comprises:

an energy source device comprising a housing and, accommodated within the housing, an energy transfer circuit;

one or more energy distribution devices, each configured to provide respective one or more external conductive loops extending outside the housing and defining a respective external energy transfer zone in a proximity of the respective one or more external conductive loops;

wherein the energy source device is configured to be brought into operational connection with one or more of the energy distribution devices; and wherein the energy transfer circuit is configured to receive electrical energy from an energy source and, when the energy source device is in operational connection with a first energy distribution device of the one or more energy distribution devices, to energize the one or more external conductive loops of the first energy distribution device so as to create a time-varying electromagnetic field in an external energy transfer zone defined by the first energy distribution device in a proximity of the one or more external conductive loops of the first energy distribution device.

When the energy source device and the energy distribution devices are toy construction elements, each comprising coupling members as described herein, the user may construct different toy construction models, e.g. including different types of energy distribution devices and/or including energy distribution devices at different positions relative to each other, so as to define one or more external energy charging zones relative to the toy construction model. Accordingly multiple user-defined geometries and spatial arrangements of energy transfer zones may be constructed in an easy yet accurate and durable manner.

In some embodiments, the plurality of toy construction elements comprises one or more electronic toy construction elements configured to receive energy from one or more of the energy distribution devices when the electronic toy construction element is positioned in one of the external energy transfer zones. Each electronic toy construction element may comprise a rechargeable energy storage device, such as a rechargeable battery, and an inductive charging circuit for charging the rechargeable energy storage device when the electronic toy construction element is positioned in one of the external energy transfer zones.

In some embodiments, the energy source device and/or one or more of the energy distribution devices is configured to:

detect a relative position coordinate and/or relative orientations of one or more electronic toy construction elements, relative to the energy source device and/or one or more of the energy distribution devices, respectively; and based on the detected relative position coordinate and/or relative orientations, energize selected ones of the external energy transfer zones. Accordingly, the toy system may control charging of electronic toy elements positioned relative to the toy construction model in an efficient manner.

In some embodiments, the plurality of energy distribution devices comprises a least a first energy distribution device defining a first external energy transfer zone having a first shape and a first size, and a second energy distribution device defining a second external energy transfer zone having a second shape and a second size wherein the first shape is different from the second shape and/or wherein the first size is different from the second size.

Accordingly, a single energy source device may be used to operate different types of energy distribution devices, thus allowing the user to adapt the energy transfer zone(s) to the user's specific needs with only a single energy source device. Accordingly, the system is flexible while keeping the component costs relatively low.

Each energy distribution device may be operable as an energy relay device operable to receive energy from the energy source device and/or from another energy distribution device and to forward at least a portion of the received energy to an energy receiving device, e.g. to an electronic toy construction element.

Preferably, the operational connection may involve a contactless energy transfer from the energy source device to the energy distribution device, e.g. via inductive and/or capacitive coupling. To this end, the energy source device and the energy distribution device may comprise respective conductive loops such as coils, optionally comprising respective magnetic cores, the coils being operable to transfer electromagnetic energy between each other via inductive coupling, such as via near field magnetic resonant coupling. Generally, the term conductive as used in the present disclosure refers to electrical conductivity. The energy distribution devices may thus be regarded as parasitic devices that are supplied with energy in a contactless manner by the energy source device.

Alternatively, the operational connection may involve transfer of electrical energy by means of physical contact via a conductive medium that is conductive for a direct current, i.e. the operational connection may be a physical contact via a conductive medium that is conductive for a direct current, e.g. by connecting the energy source device and the energy distribution device via a suitable plug and socket, via a cable, a metal-metal contact, and/or the like.

The energy source device may be mechanically and detachably connectable to the energy distribution device by means of the respective coupling members of the energy source device and the energy distribution device, respectively. Similarly, the energy source device and the energy distribution device are each mechanically and detachably connectable to other toy construction elements, in particular electronic and/or non-electronic toy construction elements, of the toy construction system by means of the respective coupling members.

In some embodiments, the first energy distribution device may be operable to generate a first field strength within the first energy transfer zone, and the second energy distribution device may be operable to generate a second field strength in the second energy transfer zone, different from the first field strength. For example, to this end the first and second energy distribution devices may include conductive loops of respective inductances, e.g. by having different number of turns and/or conductive paths of different cross-sections etc.

The toy system may include one or more of the energy distribution devices described in the following.

For the purpose of the present disclosure, the term contactless is intended to refer to energy transfer from one device to another device without a physical, conductive coupling, i.e. without transfer of electrical energy by means of physical contact via a conductive medium that is conductive for a direct current. It will be appreciated that the term contactless merely characterises the energy transfer and does not exclude that the devices are otherwise physically connected with each other. In particular, two devices may be in physical contact with each other, e.g. mechanically interconnected with each other by means of respective coupling members, while the energy transfer between them is contactless, i.e. does not rely on the physical contact as a carrier for the transfer of energy or data.

In some embodiments, the energy source device comprises:
a housing;
an internal conductive loop accommodated within the housing and defining a first energy transfer zone in a proximity of the housing;
an energy transfer circuit, accommodated within the housing and configured to receive electrical energy from an energy source and to energize the internal conductive loop so as to create a time-varying electromagnetic field in the first energy transfer zone;
wherein the energy distribution device is configured to provide an external conductive loop, external to the housing, the external conductive loop defining an external energy transfer zone in a proximity of the external conductive loop;
wherein the energy transfer circuit is further configured to energize the external conductive loop; wherein the first energy transfer zone is smaller than the external energy transfer zone; and wherein the energy source device is configured to transfer energy via the first energy transfer zone at a first rate and to cause transfer of energy via the external energy transfer zone at a second rate smaller than the first rate.

According to some embodiments, one or more of the energy distribution devices include an energy transfer circuit which may be configured to control operation of the energy distribution device, e.g. for adjusting a resonance frequency of the conductive loop, for selectively energizing the conductive loop, and/or the like.

According to some embodiments, at least one of the energy distribution devices is a modular energy distribution device comprising a plurality of mutually interconnectable parts. Each part may comprise a first coupling member and a second coupling member, e.g. at respective first and second ends of an elongated body. Each part may further comprise one or more conductive paths that may extend between the first and second coupling members. Each coupling member may be configured to be connected to a mating coupling member of one of the other of the mutually interconnectable parts so as to provide one or more conductive paths each connecting the connected parts. The mutually interconnectable parts are configured to form, when connected in a structure of mutually interconnected parts, an external conductive loop. Preferably, each of the mutually interconnectable parts is or includes a toy construction element of the toy construction system.

According to some embodiments, at least a first one of the energy distribution devices comprises an elongated element configured to be arranged by the user on a surface so as to form a user-selected loop structure. In particular, when the elongated element is arranged on a surface to form a loop structure, the loop structure surrounds and exposes a loop area of the surface on which it is placed. Accordingly, different surfaces may be transformed into a play area within which electronic toys may harvest energy, including surfaces having different surface textures, surface decorations, etc., such as carpets, tabletops, floors, blankets, etc. The surface area remains accessible to the user and is minimally obstructed. The elongated element may comprise one or more conductive paths that form the external conductive loop when the elongated element is arranged to form the loop structure. Accordingly, the user may create energy transfer zones on a variety of surfaces or structures in a flexible manner, in particular in a variety of shapes and/or sizes. According to some embodiments, the first energy distribution device is a modular device and it comprises a plurality of mutually interconnectable parts, e.g. as described above. The mutually interconnectable parts may thus be configured to form, when connected in a sequence of mutually interconnected parts, said elongated element. According to some embodiments, the elongated element comprises a plurality of mutually interconnected parts, each part being hingedly connected to one or two adjacent parts. Accordingly, the elongated member may be folded into a collapsed state, e.g. for convenient storage.

According to some embodiments, at least one of the energy distribution devices comprises a carrier sheet having embedded therein one or more conductive paths defining one or more conductive loops, e.g. as described in greater detail below, in particular in connection with the third aspect.

According to some embodiments, at least one of the energy distribution devices comprises a conductive loop configured to be selectively brought into a collapsed state and an extended state, e.g. as described in connection with the second aspect below. In particular, in some embodiments, at least a major part of the conductive loop defines an external energy transfer zone when the conductive loop is in its extended state. In some embodiments, the energy distribution device comprises a loop housing wherein at least a major part of the conductive loop extends outside the loop housing when the conductive loop is in its extended state. In some embodiments, at least a major part of the conductive loop is accommodated within the loop housing when the conductive loop is in its collapsed state, thus providing a convenient way of storing an external conductive loop when not in use. The conductive loop may define a first energy transfer zone outside the loop housing when the conductive loop is in its collapsed state. In some embodiments, the conductive loop comprises an extended number of turns, when the conductive loop is in the collapsed state and a reduced number of turns, smaller than the extended number of turns, when the conductive loop is in its extended state.

According to a second aspect, embodiments of a toy system comprise an energy source device; the energy source device comprising:
  a loop housing;
  a conductive loop configured to be selectively brought into a collapsed state and an extended state; wherein at least a major part of the conductive loop extends inside the loop housing and defines a first energy transfer zone outside the loop housing when the conductive loop is in its collapsed state; wherein at least a major part of the conductive loop extends outside the loop housing and defines an external energy transfer zone outside the loop housing when the conductive loop is in its extended state; and
  an energy transfer circuit, accommodated within the housing, configured to receive electrical energy from an energy source and to energize the conductive loop when the conductive loop is in its collapsed state so as to create a time-varying electromagnetic field in the first energy transfer zone; and to energize the conductive loop when the conductive loop is in its extended state, so as to create a time-varying electromagnetic field in the external energy transfer zone.

Accordingly, a flexible system is provided where the conductive loop may be adapted to different needs e.g. to create different sizes or shapes of conductive loops, to allow for convenient storage of the conductive loop and/or the like. The conductive loop may be collapsed or extended in a variety of ways, e.g. by folding up the loop, winding the loop around a spool, elastically deforming the loop, etc. The collapsing may be particularly useful and result in a particularly compact storage when the conductive loop is formed by one or more elongated members, such as a string, band or ribbon or by a sequence of interconnected elongated elements, etc.

Accordingly, in some embodiments, at least a major part of the conductive loop is accommodated within the loop housing when the conductive loop is in its collapsed state, thus providing a convenient way of storing an external conductive loop when not in use as an external conductive loop.

In some embodiments, the conductive loop comprises an extended number of turns, when the conductive loop is in the collapsed state and a reduced number of turns, smaller than the extended number of turns, when the conductive loop is in its extended state. Accordingly, the first energy transfer zone may be a reduced energy transfer zone, smaller than the external energy transfer zone. Accordingly, the energy source device may be operable to provide energy transfer at a higher transfer rate when the conductive loop is in the collapsed state, e.g. for fast charging an electronic device. For example, the conductive loop may be twisted and folded to create a collapsed loop with multiple turns. In other examples, the conductive loop may be wound up to form a smaller loop with multiple turns, etc.

The loop housing may be formed by, or otherwise integrated into or attached to, the housing of the energy source device, in particular in the housing of a toy construction element of a toy construction system. Alternatively, the loop housing may be a separate housing, e.g. a housing of the energy distribution device, which also may be a toy construction element of a toy construction system. The loop housing may e.g. be detachably connectable (mechanically and/or electrically) to the housing of the energy source device.

According to some embodiments of one or more aspects described herein, the energy transfer circuit is configured to energize, in particular to selectively energize, one or more conductive loops so as to create a time-varying electromagnetic field in a first energy transfer zone and in a second energy transfer zone, larger than the first energy transfer zone; wherein the first and second energy transfer zones are defined by the one or more conductive loops in a proximity of the one or more conductive loops; wherein the toy system comprises a plurality of electronic devices each configured to receive energy when positioned within the first or second energy transfer zone; wherein the second energy transfer zone is large enough to accommodate two or more of the plurality of electronic devices for concurrent energy transfer to the two or more electronic devices; wherein the first energy transfer zone is shaped and sized so as to accommodate a smaller number of the electronic devices than the second energy transfer zone; and wherein the energy source device is configured to transfer energy via the first energy transfer zone at a first rate and to transfer energy via the second energy transfer zone at a second rate smaller than the first rate.

In some embodiments, the first conductive loop is an internal conductive loop accommodated within the housing of the energy source device and the second conductive loop is an external conductive loop extending outside the housing, e.g. provided by an energy distribution device as described herein. Accordingly, the energy source device may be selectively operable as a stand-alone energy transfer device (e.g. as a fast charger for individual electronic devices) without being connected to an external energy distribution device, or together with an energy distribution device as described herein, e.g. so as to provide a larger energy transfer zone that accommodates multiple electronic devices.

In some embodiments, the first conductive loop includes a larger number of turns than the second conductive loop and/or is otherwise configured to be operable to create a stronger electromagnetic field.

In some embodiments, both the first and the second conductive loops are external conductive loops, e.g. provided by the same energy distribution device or by different energy distribution devices. For example, the second conductive loop may define a large energy transfer zone where multiple electronic devices may concurrently harvest energy while the first conductive loop may define a fast charge hot spot which may be located outside the second energy transfer zone or completely or partially within the second energy transfer zone.

In some embodiments, where the system comprises a modular energy distribution device as described herein, the energy distribution device may comprise a plurality of interconnectable parts that are configured to be interconnected so as to form one or more conductive loops, e.g. a first and a second conductive loop as described herein. Accordingly, a user may construct an energy transfer system with different energy transfer zones according to the user's needs.

Some embodiments of a toy system according to one or more of the aspects disclosed herein comprise a plurality of electronic devices each configured to receive energy when positioned within an energy transfer zone of an energy distribution device or of the energy source device.

In some embodiments of any of the aspects disclosed herein, at least some of the electronic devices that are configured to receive energy when positioned in an energy transfer zone of the toy system include an energy storage device such as a rechargeable battery, a capacitive energy storage, an inductive energy storage, and/or the like. The energy storage device of the electronic device may thus be configured to be charged by energy received when positioned in an energy transfer zone of the toy system. In some embodiments, at least some of the electronic devices do not include any energy storage device and are only operable to perform an electronic function while they are positioned in an energy transfer zone of the toy system.

In some embodiments, at least one energy transfer zone is large enough to accommodate two or more of the plurality of electronic devices for concurrent energy transfer to the two or more electronic devices. In particular, in some embodiments, the energy source device and/or an energy distribution device is configured to receive, from one or more of the plurality of electronic devices positioned within the energy transfer zone, data about one or more of the plurality of electronic devices; and to control the time-varying electromagnetic field based on the received data.

In the above and other embodiments, the energy transfer performance may be accommodated to the needs of the plurality of electronic devices. For example, the energy source device or energy distribution device may be operable to determine whether there are any electronic devices present in the energy transfer zone that require charging (or otherwise require energy to be transferred to them) and energize the conductive loop responsive to the determination. The energy source device and/or one or more of the energy distribution devices may detect the presence and, optionally, a relative position and/or orientation information of the electronic toy construction elements relative to the energy source device and/or relative to one or more of the energy distribution devices. Based on this information, the energy source device and/or one or more of the energy distribution devices may control their respective energy transfer circuits for activating selected ones of the energy transfer zones defines in respect of the toy construction model. To this end, the communicated data may include respective charging levels (or otherwise the energy need) of the electronic devices. In some embodiments, the communicated data may include data indicative of required or preferred energy transfer currents and/or powers of the electronic devices in the energy transfer zone, and the energy source device or energy distribution device may select an energy transfer current and/or power depending on the receive data. Alternatively or additionally, the communicated data may be used to schedule breaks in the energy transfer so as to allow for communication with one or more of the electronic devices positioned in the energy transfer zone. Alternatively or additionally, the energy source device and/or one or more of the energy distribution devices may be configured to detect the relative distances (and/or another suitable relative position coordinate) and/or relative orientations of one or more of the electronic toy construction elements. The position and orientation detection may be performed in a number of ways, e.g. by utilizing one or more conductive loops of the energy source device or energy distribution device, respectively, and corresponding inductive elements of the electronic toy construction elements. Alternatively or additionally, the position and orientation detection may utilize a magnetometer for measuring the geomagnetic field, and/or the like. To this end, each energy source device, each electronic toy construction element and, optionally, each energy distribution device may include a magnetometer.

In embodiments allowing for energy transfer to multiple electronic devices positioned in the same transfer zone, the conductive loops may be external or internal conductive loops, i.e. they may be internal to the energy source device and/or external to the energy source device. For example, the conductive loop may be a conductive loop of any of the embodiments of energy distribution devices described herein. In particular, when the system comprises an energy distribution device as described in connection with the third aspect, the system may adapt the energy transfer zones responsive to the communicated data and according to the needs of individual electronic devices.

In some embodiments of the toy system according to the various aspects described herein, the energy source device and/or energy distribution device may be configured to communicate with each other and/or with one or more of the electronic devices when the electronic devices are positioned in the energy transfer zone. This communication may be a one-way or a two-way communication; it may be implemented by modulating data onto the time-varying electromagnetic field used for energy transfer, i.e. onto the current or voltage used for energizing the conductive loop. Alternatively or additionally, the communication may be implemented by a separate mechanism, e.g. a separate inductive coupling, magnetic communication, a radio communication system such as Bluetooth or another short-range radio communication technology and/or the like.

According to a third aspect, embodiments of a toy system comprise:

an energy distribution device comprising a carrier sheet and a plurality of conductive paths embedded into the carrier sheet;

an energy transfer circuit configured to receive electrical energy from an energy source and to selectively energize a plurality of subsets of the plurality of conductive paths, the plurality of subsets comprising a first subset and a second subset;

wherein the first subset of conductive paths defines a first energy transfer zone in a proximity of the first subset of conductive paths, and energizing the first subset creates a time-varying electromagnetic field in said first energy transfer zone;

wherein the second subset of conductive paths defines a second energy transfer zone in a proximity of the second subset of conductive paths, and energizing the second subset creates a time-varying electromagnetic field in said second energy transfer zone; the second energy transfer zone being different from the first energy transfer zone.

The energy transfer circuit may be comprised in the carrier sheet or it may be comprised in a separate energy source device which may be operationally connectable to the carrier sheet, e.g. as described in connection with the first aspect. For example, the energy source device may be permanently attached to the carrier sheet or detachably attachable to the carrier sheet by suitable coupling members, and/or it may be operationally connectable for contactless energy transfer from the energy source device to the conductive paths of the carrier sheet.

Accordingly, this and other embodiments of the system described herein may selectively create different energy transfer zones, e.g. so as to provide an optimized energy transfer depending on the number of electronic devices to be provided with energy, their positions and/or the like.

The carrier sheet may e.g. be a stiff plate, a sheet of bendable material, a flexible sheet, such as a mat or foil, a mesh, a grid or any other support structure that provides sufficient structural support for the conductive paths across a surface. The carrier sheet may be made from plastic, wood, textile, cardboard or any other suitable material or combination of materials.

In some embodiments, each of the conductive paths forms a conductive loop; and wherein a selected subset consists of one or more conductive loops. Hence, by selectively energizing selected one or more loops the energy transfer zone geometry and/or the energy transfer rate may be adjusted.

In alternative embodiments, the conductive paths form a grid of mutually crossing conductive paths. The system may be operable to selectively energize selected subsets of the mutually crossing conductive paths so as to energize conductive loops of respective sizes and shapes. In yet further embodiments, the system may include both conductive loops and a grid of crossing conductive paths. The conductive paths may cross at respective intersection points but they may be electrically insulated from each other at the intersection points.

In one embodiment, the system comprises a first set of conductive paths wherein one end of each of the first set of conductive paths is selectively connectable to none or one of a first feeding path and a first return path while the respective other ends of the first set of conductive paths or interconnected with each other. The first feeding path and the first return path are connectable to the energy transfer circuit. Accordingly, one or more of the first set conductive paths may concurrently be connected, e.g. by respective switches, to the first feeding path. Similarly, one or more other ones of the first conductive paths may concurrently be connected, e.g. by respective switches, to the first return path. Accordingly, respective conductive loops may be formed, each loop including the first feeding and return paths and selected one or more of the first set of conductive paths. Similarly, the system comprises a second set of conductive paths wherein one end of each of the second set of conductive paths is selectively connectable to none or one of a second feeding path and a second return path while the respective other ends of the second set of conductive paths or interconnected with each other. The second feeding path and the second return path are connectable to the energy transfer circuit. Accordingly, one or more of the second set conductive paths may concurrently be connected, e.g. by respective switches, to the second feeding path. Similarly, one or more other ones of the second conductive paths may concurrently be connected, e.g. by respective switches, to the second return path. Accordingly, respective conductive loops may be formed, each loop including the second feeding and return paths and selected one or more of the second set of conductive paths. The conductive paths of the first set may each cross one or more of the conductive paths of the second set, but they may be electrically insulated from each other. Accordingly, by selectively energizing selected one or more of the conductive paths of the first set and selected one or more of the conductive paths of the second set, respective loop patterns may be defined, thus resulting in respective energy transfer zone geometries. Also, by energizing fewer or more of the conductive paths, the resulting energy transfer rate may be adjusted.

In alternative embodiments, the conductive paths form a grid of mutually crossing conductive paths, the grid defining a plurality of intersection nodes at which two or more of the conductive paths cross each other; wherein the system comprises a plurality of switches associated with respective ones of the intersection nodes wherein each switch is configured to provide conductive connections between respective ones of the conductive paths crossing at the intersection node associated with said switch.

The control of the respective switches for selectively energizing respective conductive paths may be controlled by the energy transfer circuit of a separate energy source device connectable to the carrier sheet and/or by a control circuit embedded in the carrier sheet.

In some embodiments, the energy source device is configured to obtain information from and/or about one or more electronic devices positioned in a proximity of the carrier sheet, to select a subset of the conductive paths based on the obtained information and to energize the selected subset of conductive paths, e.g. by operating one or more of the switches. To this end, the energy source device and/or the electronic devices may determine where the electronic devices are positioned on the carrier sheet. It will be appreciated that this detection may be performed in a number of ways. For example, an electronic device may detect its position relative to the carrier sheet and communicate this information to the energy source device. In some embodiments, an electronic device may sense the currents and/or power from the conductive paths of the carrier sheet as the energy source device selectively energizes respective conductive paths, e.g. during an initial scanning operation. The electronic device may then communicate information to the energy source device so as to alert the energy source device of at which time during the scan the electronic device has sensed the highest current/power. From this information the energy source device may determine at least an approximate position of the electronic device relative to the carrier device and create a current routing pattern to satisfy all of the detected electronic devices identified at various positions.

It will be appreciated that the energy source device may select different subsets (e.g. different current patterns) at different times e.g. so as to transfer energy to one set of electronic devices with one subset for a first period of time, then reconfigure the pattern of conductive paths to transfer energy to another set of electronic devices for a second period of time. This allows efficient energy transfer to all electronic devices even if they are arranged in awkward positions.

In other embodiments, the energy source device deduces the positions of electronic devices by performing a scan through the various conductive paths and by sensing a detectable impedance change and/or be receiving a message from an electronic device that it receives energy. The information about the detected positions of electronic devices may then be used to decide on the current routing and the time multiplexing of various patterns/subsets. Alternatively or additionally, the energy source device may detect the position and/or orientation of electronic devices in a proximity of the energy source device in a different manner.

In some embodiments of any of the aspects disclosed herein, the energy source device comprises an energy storage device, such as a rechargeable battery, i.e. the energy source may also be accommodated within the housing. Alternatively or additionally, the energy source device may comprise an interface for receiving electrical energy from an external energy source, e.g. via a power cable, via a wireless charging system and/or the like.

In some embodiments of any of the aspects disclosed herein, at least some of the energy distribution devices are passive energy distribution devices without their own energy source. Accordingly, they are configured to transfer energy via their energy transfer zones only when operationally connected to an energy source device as described herein, i.e. they may be referred to as parasitic devices.

In some embodiments of any of the aspects disclosed herein, a housing of the energy source device may be a box-shaped housing. The housing may be made from any suitable material, such as plastics.

The energy transfer circuit of an energy source device or of an energy distribution device may include logic configured to control a current and/or power fed into the one or more conductive loops of the system. To this end, the logic may be configured to detect a property of the conductive loop, e.g. an impedance, an inductance and/or the like, and control the current and/or power responsive to the detected property.

Generally, an energy transfer zone is a volume in a proximity of the conductive loop where electronic devices are capable of harvesting energy from the time-varying electromagnetic field induced by the electrical currents through the conductive loops. It will be appreciated that the energy transfer zone may not be delimited by a sharp boundary but rather represented by a gradual decrease of efficiency of the energy transfer. The exact extent of the energy transfer zone may also depend on the energy harvesting capabilities of the receiving electronic device. Typically, the conductive loop delimits a loop area, e.g. a plane or curved surface. The energy transfer zone typically extends through said loop area and on both sides on the loop area (e.g. above and below the loop area, if the loop area extends substantially horizontally). The energy transfer zone may further extend into a ring outside the conductive loop. The energy transfer zone may define dome-shaped volumes, each extending across the loop area on respective sides of the loop area.

Generally, each conductive loop may define an energy transfer zone. In some embodiments, the system may comprise multiple conductive loops that together define an energy transfer zone.

Each conductive loop may comprise a single turn of a conductive path or multiple turns of a conductive path, such as at least 5 turns, at least 10 turns, a least 20 turns, or even more turns. The conductive loop may be made from any suitable conductive material, such as metal, e.g. including aluminium, copper and/or the like. The conductive material may be provided as a wire or as a flat band or ribbon or in another suitable form.

Embodiments of the various aspects of the toy system described herein may include one or more electronic devices configured to harvest energy, when positioned in the energy transfer zone, from the time-varying electromagnetic field created in the energy transfer zone. To this end, embodiments of electronic devices may include an inductive element, such as a conductive loop, e.g. a coil, comprising a winding, a winding wound around a magnetic core, and/or the like, and an energy receipt circuit operationally coupled to the inductive element. Some embodiments of an electronic device may include an energy storage device, such as a rechargeable battery or the like, and the energy receipt circuit may be configured to charge the energy storage device upon receipt of harvested energy. Alternatively or additionally, the electronic device may include a function device operable to be powered by the energy storage device and/or directly from the harvested energy.

The energy source device and/or energy distribution device of a toy system according to any of the aspects described herein may be a toy construction element of a toy construction system. Accordingly, the energy source device and/or energy distribution device may comprise a housing, the housing comprising coupling members compatible with the toy construction system.

According to some embodiments, the toy construction system comprises one or more electronic toy construction elements configured to receive energy from the contactless energy transfer system described herein.

In some embodiments, at least one, such as each, of the electronic toy construction elements is a passive electronic toy construction element, i.e. an electronic toy construction element that does not comprise its own battery or other energy storage. Instead, the passive electronic toy construction element uses, at its sole power supply, energy that is contactlessly received via the contactless energy transfer system described herein in order to drive an electronic function device of the electronic toy construction element. The passive electronic toy construction element is thus only operable to activate its function device while the passive electronic toy construction element is operationally connected for contactless receipt of energy from an energy source device. Accordingly, in some embodiments of a toy construction system, only some of the toy construction elements and, in particular, the energy source device, include their own energy storage device, thus reducing the number of components that require their own energy storage device. Accordingly, this reduces manufacturing costs, facilitates recycling and helps prolonging the overall lifetime of the system. Nevertheless, in other embodiments, some or all electronic devices, e.g. some or all electronic toy construction elements, include an internal rechargeable power storage device configured to be charged by energy received via the contactless energy transfer system. Accordingly, such electronic devices, e.g. such electronic toy construction elements, are capable of performing their electronic function also when not currently positioned in an energy transfer zone, as long as they are charged from time to time by positioning them within an energy transfer zone of the system.

Each electronic device of an embodiment of the toy system according to one or more of the aspects described herein, e.g. each electronic toy construction element, may comprise an electronic function device. A function device may be any suitable device for performing a function, such as a function that provides a user-perceptible effect, such as a visible and/or audible effect.

Examples of function devices may include any suitable mechanical and/or electrical device, arrangement, and/or circuitry adapted to perform one or more mechanical and/or electrical functions.

Examples of a mechanical function that some embodiments of a function device can perform include: driving a rotatable output shaft, conductive loop-up a string or a chain which enables pulling an object closer to an electronic device, moving a hinged part of the electronic device, etc. The mechanical function may thus enable opening or closing a door, ejecting an object, rotating a turntable, moving a linear actuator, etc. Such mechanical motions can be driven by an electric motor.

Examples of an electrical function that some embodiments of a function device can perform include emitting constant or blinking light, activating several lamps in a predetermined sequence, emitting audible sound such as beep, alarm, bell, siren, voice message, music, synthetic sound, natural or imitated sound simulating and/or stimulating play activities, playback of a sound, and/or other audio content, etc.

Accordingly, the function device may be selected from a motor, a light source (e.g. one or more LEDs) and a sound source (e.g. a loudspeaker). In some embodiments the plurality of electronic devices includes:
 a first electronic device comprising a first type of function device, e.g. a motor;
 a second electronic device comprising a second type of function device, e.g. a light source or a sound source, different from the first type of function device (e.g. for providing a different physical effect than the first function device).

Embodiments of a toy system may comprise different types of electronic devices with respective function devices.

Each electronic device may include an energy receipt circuit, e.g. a circuit comprising a conductive loop or other resonant element configured to be energized by, and harvest energy from, a time-varying electromagnetic field.

Each electronic device may comprise a housing. The function device may be accommodated within said housing and/or the energy receipt circuit may be accommodated within said housing. The housing may be box-shaped. The housing may define a top face and a bottom face, opposite the top face.

Generally, toy construction elements, in particular electronic toy construction elements, energy source devices and/or energy distribution devices comprise an element body. When the toy construction element comprises electronic components, the element body may form a housing for accommodating electronic components. The element body may comprise coupling members configured to allow mechanical and detachable attachment of the toy construction element to one or more other toy construction elements the toy construction system. At least some of the coupling members may extend from the top face. The element body may further comprise one or more side faces extending between the top and bottom faces.

In some embodiments all electronic toy construction elements are configured to be interchangeably and detachably connectable to other toy construction elements of the toy construction system. In some embodiments, the electronic toy construction elements may all have the same size and shape and corresponding coupling members, at least to an extent that they can be interchangeably connected within a toy construction model so as to selectively replace one another at any given position of the toy construction model to which at least one electronic toy construction element can be attached.

Similarly, the energy source device may comprise a housing; the energy transfer circuit may be accommodated within said housing. The housing may be box-shaped as described above. The housing may comprise one or more coupling members, also as described in connection with the electronic toy construction elements. In some embodiments, the energy source device has the same shape and size as the electronic toy construction elements, at least to an extent that they can be interchangeably connected within a toy construction model so as to selectively replace one another at any given position of the toy construction model. Yet similarly, some or all energy distribution devices may comprise a housing. An energy distribution device may include an energy transfer circuit which may be accommodated within said housing. The housing may comprise coupling members as described herein.

Each electronic toy construction element and/or each energy source device and/or each energy distribution device may comprise one or more coupling members for detachably attaching the electronic toy construction element or energy source device or energy distribution device, as the case may be, to other toy construction elements of the toy construction system, e.g. to one or more other electronic toy construction elements and/or to one or more other energy source devices and/or to one or more energy distribution devices and/or to one or more non-electronic toy construction elements of the toy construction system. Non-electronic toy construction elements are toy construction elements not including electronic function devices, energy transfer circuits, or other electronic components. Accordingly, the toy construction system may include a plurality of toy construction elements, the plurality of toy construction elements including a plurality of electronic toy construction elements and one or more energy source devices. The plurality of toy construction elements may further comprise one or more energy distribution devices and one or more other toy construction elements, in particular, non-electronic toy construction elements, such as conventional toy construction elements, e.g. consisting of a moulded plastic element without any electronic components.

In some embodiments, each toy construction element of the toy construction system and, in particular, each electronic toy construction element and each energy source device, comprises coupling members for detachably interconnecting the toy construction elements with each other to create coherent spatial structures, also referred to as toy construction models. Hence, toy construction elements that have been interconnected with each other by means of the coupling members can again be disconnected from each other such that they can be interconnected again with each other or with other toy construction elements of the system, e.g. so as to form a different spatial structure. In some embodiments, the toy construction elements are provided with mutually mating coupling members, such as with a first and a second type of coupling members, such as coupling pegs and peg-receiving recesses for frictionally engaging the pegs, or other pairs of mating or otherwise complementary coupling members configured to engage each other so as to form a physical connection. One type of coupling members may be located on one side, e.g. the top side, of the toy construction element while another, complementary type of coupling members may be located on an opposite side, e.g. the bottom side, of the toy construction element. In some embodiments, the toy construction elements include pegs extending from the top face of the toy construction element and corresponding peg-receiving cavities extending into the bottom face of the toy construction element for frictionally engaging the pegs by a suitable clamping force. The coupling members may be positioned on grid points of a regular grid; in particular, the coupling members of the toy construction elements may be arranged such that the coupling members of a set of mutually interconnected toy construction elements are positioned on grid points of a three-dimensional regular grid. The dimensions of the toy construction elements may be defined as integer multiples of a unit length defined by the regular grid. It will be understood that a three-dimensional grid may be defined by a single unit length, by two unit lengths, e.g. one unit length applicable in two spatial dimensions while the other unit length is applicable in the third spatial dimension. Yet alternatively, the three-dimensional grid may define three unit lengths, one for each spatial dimension.

When the coupling members are detachably interconnectable, the user may deconstruct previously built spatial structures and re-use the toy construction elements so as to build new spatial structures. For example, the toy construction elements may be interconnected each other by traction/friction or by an interlocking connection. The toy construction elements may be configured such that two toy construction elements can be connected to a toy construction model such that respective faces of the toy construction elements about each other or are at least in close proximity and facing each other. To this end, the two toy construction elements may be directly interconnected with each other by means of their respective coupling members or they may both be interconnected with a part of a toy construction model, each directly next to each other.

The toy system further provides contactless energy transfer between at least the energy source device or energy distribution device and the electronic toy construction elements. Consequently, the individual toy construction elements may be made compact and relatively inexpensive. Moreover, in this way, a large variety of functional interactions may be created with only relatively few different types of toy construction elements. The compactness and modularity further increases the flexibility in which the electronic toy construction elements can be incorporated into even relatively small toy construction models. In some embodiments, the housing of an electronic toy construction element and/or of an energy source device has a height (excluding the protruding coupling members) of between 3 mm and 10 mm, such as between 3.2 mm and 9.6 mm, such as 3.2 mm or 6.4 mm or 9.6 mm. The length and width of the housing may each be between 5 mm and 35 mm, such as between 8 mm and 32 mm, such as 8 mm, 16 mm, 24 mm or 32 mm. For example the lateral dimensions may be 16 mm×16 mm or 16 mm×24 mm or 16 mm×32 mm. It will be appreciated, however, that other dimensions may be selected.

A toy construction model constructed from toy construction elements disclosed herein may comprise a first electronic toy construction element and a second electronic toy construction element, directly or indirectly connected with each other by means of their coupling members. Each of the first and second toy construction elements may comprise a rechargeable battery, an electrical load and a contactless charging circuit. Each contactless charging circuit may comprise a receiving induction coil for converting the alternating magnetic field into electric current for charging the rechargeable battery of the respective electronic toy construction element. The inductive charging circuitry of each electronic toy construction element is connected to the rechargeable battery and to the electrical load of said toy construction element only.

Accordingly the chargeable batteries may be selected so that the capacity of each battery corresponds to the electric consumption of the electric load connected to that battery, and so that a relatively larger battery may be used for powering heavy electric consumer or load, and a relatively smaller battery may be selected to be used for powering a light consumer or load.

In this relation, each of the inductive charging circuitries may comprise a switch circuitry being adapted for, upon appropriate wireless activation, connecting or disconnecting the load of the respective electronic toy construction element from the battery of said electronic toy construction element.

The electrical loads may comprise one or more of the following, an electrical light emitter, an electric motor or actuator, an electric sound emitter, a signal transmitter or a signal receiver.

The present disclosure relates to different aspects including the aspects described above, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

Additional features and advantages will be made apparent from the following detailed description of embodiments that proceeds with reference to the accompanying drawings.

DETAILED DESCRIPTION

Various aspects and embodiments of a modular toy construction system comprising a plurality of electronic toy construction elements and a contactless energy transfer system including one or more energy source devices will now be described with reference to toy construction elements in the form of bricks. In this particular and in corresponding embodiments, the electronic toy construction elements and energy source devices each have a housing that is generally shaped as an orthogonal polyhedron with flat side faces and having coupling members extending from its upper surface and a cavity extending into its bottom surfaces. However, other shapes and sizes of electronic toy construction elements may be used, e.g. box-shaped or tile-shaped toy construction elements of different dimensions and with different numbers of coupling members. Moreover, while the brick-shape has proven to be particularly useful, the invention may be applied to other forms of toy construction elements for use in play applications educational applications, and/or the like. Yet further, it will be appreciated that embodiments of a contactless energy transfer system as described herein may be used in other applications, e.g. applications using other types of toys, other than toy construction systems, and even for contactless energy transfer to electronic devices other than toys.

Figure 1:
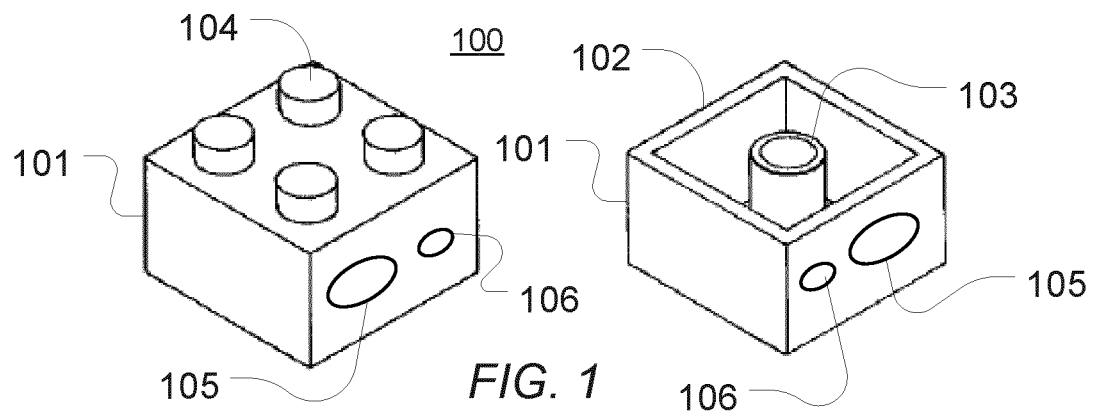
FIGS. 1-3 show examples of an electronic toy construction element.

FIG. 1 shows an example of an electronic toy construction element, generally designated 100. In particular, the electronic toy construction element comprises a generally box-shaped housing 101 with coupling pegs 104 extending from its top surface and with a cavity extending into the element from the bottom. The cavity is defined by sidewalls 102 and by a central, downwardly extending tube 103. The coupling pegs of another toy construction element can be received in the cavity in a frictional engagement as disclosed in U.S. Pat. No. 3,005,282. The construction elements shown in the remaining figures have this known type of coupling members in the form of cooperating pegs and cavities. However, other types of coupling members may also be used in addition to, or instead of, the pegs and cavities. The coupling pegs are arranged across the top surface in a square planar grid, i.e. defining orthogonal directions along which sequences of coupling pegs are arranged. The distance between neighbouring coupling pegs is uniform and equal in both directions. This or similar arrangements of coupling members at coupling locations defining a regular planar grid allow the toy construction elements to be interconnected in a discrete number of positions and orientations relative two each other, in particular at right angles with respect to each other. In a constructed model, the coupling members of multiple toy construction elements may thus be located on grid points of a three-dimensional grid defined relative to the construction model.

In some embodiments, the toy construction elements are made from plastics material, e.g. thermoplastic polymers, or from another suitable material. The toy construction elements may e.g. be made by an injection molding process or by another suitable manufacturing process.

The electronic toy construction element 100 comprises a sensor in the form of a microphone 106 and a function device in the form of a loudspeaker 105 or other sound source, both accommodated within the housing 101 of the electronic toy construction element. As will be described in more detail below, other examples of electronic toy construction elements may comprise another type of sensor and/or another type of function device. Other examples of electronic toy construction elements may only include a sensor or only include a function device.

Figure 2:
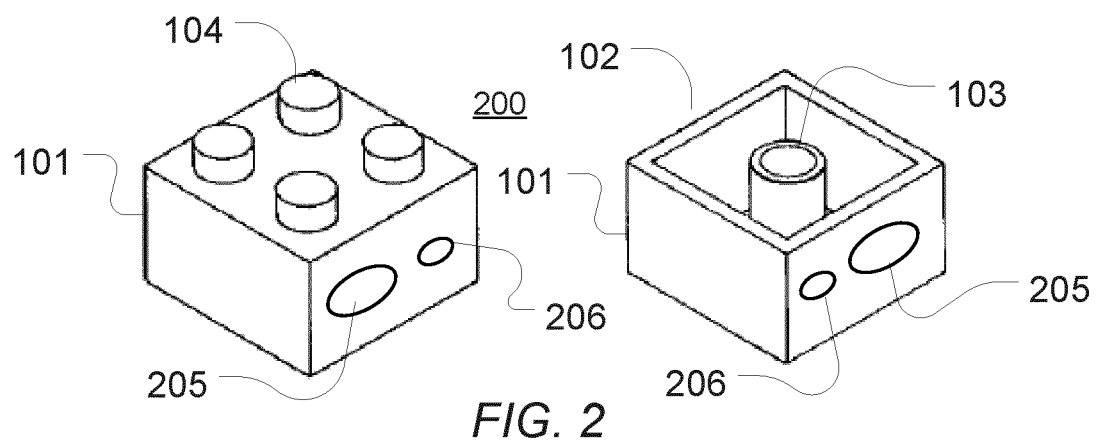

For example, FIG. 2 shows another example of an electronic toy construction element, generally designated 200, similar to the electronic toy construction element of FIG. 1. However, the electronic toy construction element of FIG. 2 comprises a light sensor 206 instead of a microphone, and an LED or other suitable light source 205 instead of a loudspeaker.

Figure 3:
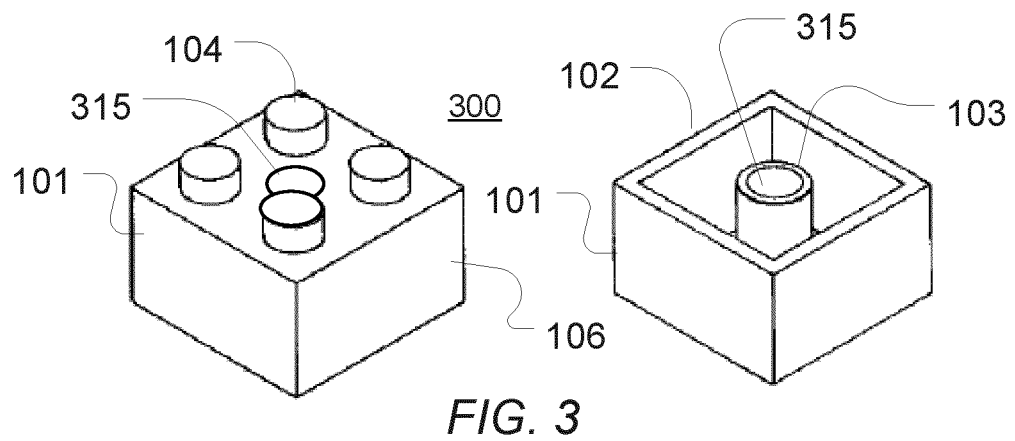

Similarly, FIG. 3 shows yet another example of an electronic toy construction element, generally designated 300, similar to the electronic toy construction element of FIG. 1. However, the electronic toy construction element of FIG. 3 comprises a tubular hole 315 extending through the housing and configured to receive a shaft, e.g. an axel having a suitable cross section, e.g. a cross-shaped cross section. The electronic toy construction element 300 comprises a motor for imparting torque onto a shaft that extends into the hole, and a rotational encoder configured to detect an angular position of the shaft. The motor and encoder are accommodated inside the housing 101 and not visible in FIG. 3.

The electronic toy construction elements of FIGS. 1-3 are similar in construction. They all have the same general shape such that they can interchangeably be inserted into a toy construction model and easily attached to each other. They also all include a sensor, a function device, an energy receipt circuit and one or more inductive elements, as will be described in greater detail with reference to FIG. 4. The electronic toy construction elements of FIGS. 1-3 only differ in the type of sensor and function device they comprise. However, it will be appreciated that other embodiments of toy construction systems may include electronic toy construction elements of different shapes or sizes, e.g. so as to accommodate the specific sensors of function devices and/or in order to make them more easily distinguishable by the user.

Figure 4:
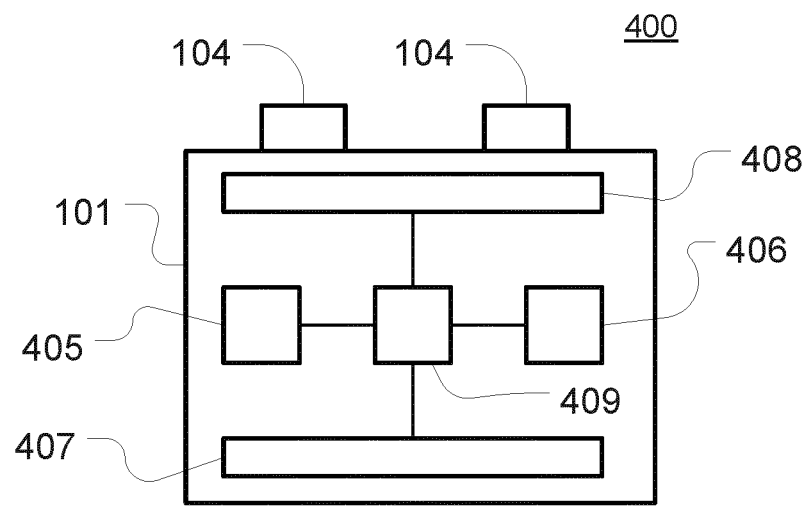
FIG. 4 shows a schematic block diagram of an example of an electronic toy construction element.

FIG. 4 shows a schematic block diagram of an example of an electronic toy construction element, generally designated 400, e.g. of one of the electronic toy construction elements shown in FIGS. 1-3.

The electronic toy construction element comprises a housing 101 defining a top face which is provided with coupling members 104 as described above, in this example in the form of pegs. The electronic toy construction element further comprises, accommodated within housing 101, an energy receipt circuit 409, a first inductive element 407 and a second inductive element 408, a sensor 406 and a function device 405.

The first and second inductive elements may comprise respective conductive loops of electrically conductive wire, ribbon, etc. The conductive loops may be formed as coils having multiple turns of conductive wire, optionally including a magnetic core around which the conductive wire is wound. In the example of FIG. 4, the first inductive element 407 is arranged proximal to a bottom face of the toy construction element and substantially defining a plane parallel to the bottom face. Similarly, the second inductive element 408 is arranged proximal to a top face of the toy construction element and substantially defining a plane parallel to the top face. In this manner, the first inductive element can provide an inductive coupling with a corresponding second inductive element of another electronic toy construction element or with a conductive loop energized by an energy source device as described herein, when the other electronic toy construction element or conductive loop is in close proximity to the housing 101. In some embodiments, the energy receipt circuit 409 may further be configured to operate as a contactless communication circuit. The electronic toy construction element may thus communicate with, and harvest energy from, another electronic toy construction element or an energy source device as described herein.

Similarly, the second inductive element 408 can provide an inductive coupling with a corresponding first inductive element of another electronic toy construction element or with a conductive loop energized by an energy source device as described herein, when the other electronic toy construction element or conductive loop is in close proximity to the housing 101, so as to harvest energy and or to communicate.

The communication via the respective inductive couplings may use any suitable communications technology for ultra-short-range communication, such as near-filed-communication. The energy harvesting may use any suitable mechanism for contactless inductive energy transfer between inductive elements. The energy harvesting and, optionally, the communication are controlled by the energy receipt circuit 409. Alternatively, the electronic toy construction element may comprise a separate communications circuit. Optionally, the electronic toy construction element may include further processing devices such as a programmed microprocessor for controlling one or more functions of the electronic toy construction element.

Accordingly, the electronic toy construction element may receive electrical energy via the inductive element 407 for powering the energy receipt circuit 409, the sensor 406 and the function device 405. Moreover, in some embodiments, the electronic toy construction element may receive control signals and control the function device responsive to the received control signal. In particular, the control signal may represent an on/off signal and/or other operational parameters of the function device. For example, when the function device is a motor, the control signal may represent a direction and/or speed of rotation. Similarly, when the function device is a loudspeaker, the control signal may represent a volume and/or audio content to be played; when the function device is a light source, the control signal may represent a brightness and/or color of the light to be emitted.

The communication may be a two-way communication, so as to allow the electronic toy construction element to communicate its identity and/or operational characteristics, e.g. by communicating a unique identifier and/or an identifier identifying a type of electronic toy construction element, e.g. whether it comprises a motor, light source, loudspeaker etc. Moreover, in some embodiments, the electronic toy construction element may communicate a sensor signal representing a quantity sensed by the sensor 406. Yet further, the electronic toy construction element may communicate identifiers identifying other electronic toy construction elements of a chain or network of interconnected electronic toy construction elements, as will be described below. To this end, the energy receipt circuit may comprise a memory for storing an ID of the electronic toy construction element and/or received identifiers from neighboring electronic toy construction elements. In some embodiments, the electronic toy construction element may communicate information about recent use statistics and/or information about a charging state of an internal, chargeable energy storage device, as described herein.

The electronic toy construction element may further forward control signals received via one of the inductive elements to the other of the inductive elements. Similarly, the electronic toy construction element may inductively transfer electrical energy which the electronic toy construction element has received by one of the inductive elements via the other of the inductive elements.

The data communication and/or energy transfer via the inductive elements is controlled by energy receipt circuit 409. The energy receipt circuit may perform relevant functions for implementing a suitable communications protocol, e.g. functions such as the encoding/decoding of data, message arbitration, error correction, etc. It will be appreciated that, in some embodiments, the electronic toy construction elements may comprise separate circuits associated with the respective inductive elements. Moreover, the energy receipt circuit may control operation of the function device and/or the sensor, or at least receive sensor signals from the sensor and forward control signals to the function device. Alternatively, the electronic toy construction element may include a separate control circuit communicatively coupled to the energy receipt circuit 409.

It will be appreciated that several modifications may be made to the electronic toy construction element of FIG. 4. For example, some embodiments of electronic toy construction elements may include only a single inductive element. Yet alternative embodiments of electronic toy construction elements may merely receive electrical energy but not inductively relay it to another toy construction element. Yet further, some embodiments of an electronic toy construction element may include one or more inductive elements proximal to one or more of the side faces of the electronic toy construction elements so as to allow communication and/or energy transfer across said side faces. Such inductive elements may be provided in addition or alternative to the inductive elements proximal to the top and bottom surfaces. In some embodiments, the electronic device comprises two coils arranged with their respective coil axes at an angle, in particular a right angle, relative to each other. This allows for an efficient energy harvesting at different orientations of the electronic device. Yet further, some electronic toy construction elements may only include a function device but no sensor or vice versa. In some embodiments, the electronic device comprises a magnetometer, e.g. so as to determine the strength of a geomagnetic field along a predetermined direction, e.g. orthogonal to the coil axes.

In some embodiments, the electronic device may include an energy storage device, such as a rechargeable energy storage device, such as a rechargeable battery, a rechargeable capacitor, or the like. The energy storage device may be configured to provide electrical energy to the other components of the electronic toy construction element, and it may be configured to be re-charged by energy received via the inductive elements 407 and/or 408.

The sensor may be a light sensor, sound sensor, rotational encoder, proximity sensor, accelerometer, gyro, and/or any other suitable sensor.

The function device may be a light source, e.g. an LED, a loudspeaker, a motor, and or another function device operable to perform a user-perceivable function.

Figure 5A:
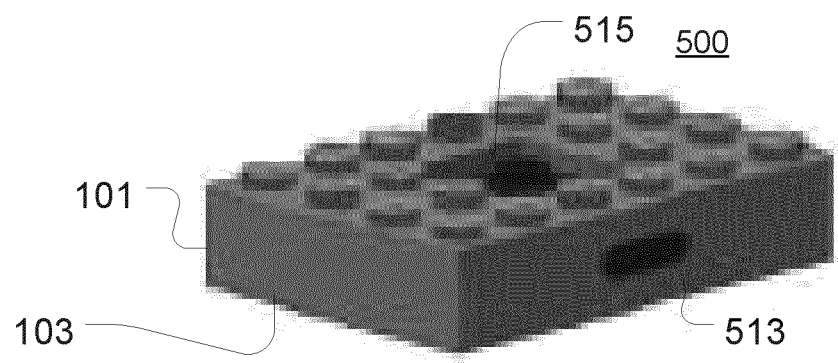
FIGS. 5A-B illustrate an example of an energy source device.
Figure 5B:
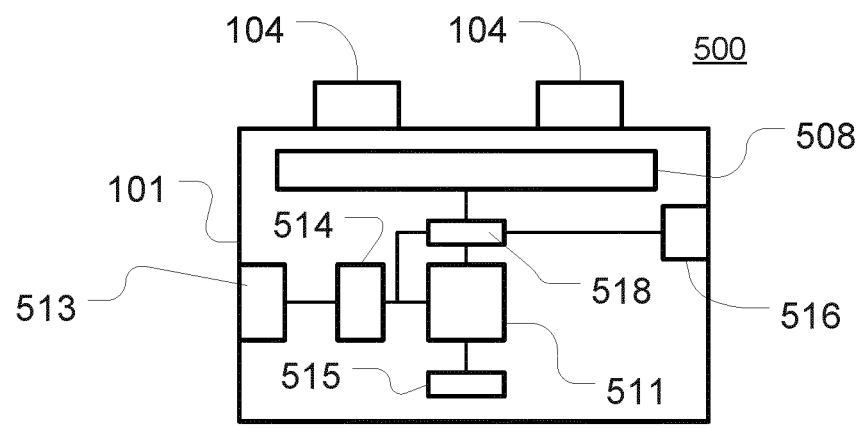

FIGS. 5A-B illustrate an example of an energy source device, generally designated 500. In particular, FIG. 5A shows a view of the energy source device while FIG. 5B shows a schematic block diagram of the energy source device. The energy source device comprises a housing 101 having coupling members 103 and 104 as described in connection with FIG. 1.

Moreover, the energy source device comprises, accommodated inside the housing, a processing unit 511, an energy transfer circuit 518, an inductive element 508, an energy storage device 514, a wired interface 513, such as a mini USB socket, and an interface 515 for connecting optional further functional components.

The processing unit 511 may e.g. comprise one or more microcontrollers, one or more microprocessors, and/or one or more other suitable processing units, or combinations thereof.

The energy storage device 514 may be a rechargeable energy storage device, such as a rechargeable battery or the like. The energy storage device 514 is configured to provide electrical energy to the other components of the energy source device, including energy to be inductively transferred to other electrical toy construction elements via the inductive element 508.

The inductive element 508 may comprise a loop, e.g. a coil, of electrically conductive wire, ribbon, etc. A coil may optionally include a magnetic core around which the coil is wound. In the example of FIG. 5, the inductive element 508 is arranged proximal to a top face of the toy construction element and substantially defining a plane parallel to the top face. In this manner, the inductive element can provide an inductive coupling with a corresponding inductive element of an electronic toy construction element or of an energy distribution device as described herein when the electronic toy construction element or energy distribution element is in close proximity to the housing 101, in particular when the electronic toy construction element or energy distribution device is attached to the housing 101 via corresponding coupling members.

The energy transfer circuit 518 may further be configured to operate as a communications circuit for effecting contactless communication via the inductive element as described in connection with the electronic toy construction elements of FIGS. 1-4.

The energy source device may thus communicate with and/or inductively provide energy to an electronic device, in particular an electronic toy construction element, either directly or via an energy distribution device as described herein.

As described in connection with the electronic toy construction element of FIG. 4, the communication via the respective inductive couplings may use any suitable communications technology for ultra-short-range communication, such as near-filed-communication. The energy harvesting may use any suitable mechanism for contactless inductive energy transfer between inductive elements.

Accordingly, the energy source device 500 may provide electrical energy to other toy construction elements via the inductive element 508. Moreover, the energy source device may transmit control signals to electronic toy construction elements that are directly or indirectly coupled inductively to the energy source device so as to control the function device of such electronic toy construction element and/or so as to control the rate at which the electronic toy construction element harvests energy from the energy source device.

The energy source device may further receive signals from such inductively coupled electronic toy construction element, such as signals representing the identity and/or operational characteristics of such electronic toy construction element, e.g. information about recent use statistics and/or a current charging state of an energy storage device of the electronic toy construction element.

The data communication and/or energy transfer via the inductive element is controlled by the energy transfer circuit 518. To this end, the energy transfer circuit may perform relevant functions for implementing a suitable communications protocol, e.g. functions such as the encoding/decoding of data, message arbitration, error correction, etc. It will be appreciated that, in some embodiments, the energy source device may include more than one inductive element and/or more than one energy transfer circuit.

The energy source device further comprises a wired connector 513, e.g. so as to receive electrical energy for charging the energy storage device, for communicating with an external device and/or the like.

Alternatively or additionally, the energy source device may be operable to be receive energy in a different manner, e.g. via the inductive element, or the like.

The energy source device may include one or more additional connectors 516 for electrically connecting an energy distribution device as described herein. The energy transfer circuit may thus further control the energy transfer via a connected energy distribution device.

The connector 516 may be a wired connector or a contactless connector, e.g. using an inductive element such as a coil which cooperates with a corresponding inductive element of an energy distribution device, e.g. an energy distribution device positioned adjacent to the energy source device or an energy distribution device positioned at a distance from the energy source device. The inductive coupling may e.g. utilize near field magnetic resonant coupling. In some embodiments, the connector may be in the form of a plug or socket, e.g. as described in WO 2016/177823, or electrical or inductive connection to the energy distribution device may be provided via coupling members of the energy source device, e.g. via coupling members 104 on the top surface of the energy source device or via corresponding coupling members 103 on the bottom side of the energy source device, e.g. as described in EP 2340093.

The processing unit 511 is configured, e.g. by a suitable program executed on the processing unit, to control the energy transfer circuit and to process the data received from electronic toy construction elements, from other energy source devices and/or from additional electronic toys or other external processing devices with which the energy source device is communicatively coupled via the inductive element 508 and/or via the wired connector 513. The processing unit further creates control data and/or other data to be transmitted to electronic toy construction elements, to other energy source devices and/or to additional electronic toys or other external processing devices with which the energy source device is communicatively coupled via the inductive element 508 and/or via the wired connector 513. These data may e.g. include control data for controlling the function device or the energy harvesting of an electronic toy construction element.

It will be appreciated that several modifications may be made to the energy source device of FIGS. 5A-B. For example, some embodiments of energy source devices may include more than one inductive element, e.g. two coils arranged with their respective coil axes at an angle, in particular a right angle, relative to each other. Other embodiments may not include any internal inductive elements but may be connectable to one or more external conductive loops. Yet further, some embodiments of an energy source device may not comprise a separate processing unit; instead, the operation may be controlled merely by an energy transfer circuit. Yet further, some embodiments of an energy source device may not include any internal energy storage device but merely receive energy from an external energy source via interface 513. Yet further, some embodiments of an energy source device may not comprise an additional connector 515. In some embodiments, the energy source device comprises a magnetometer, e.g. so as to determine the strength of a geomagnetic field along a predetermined direction, e.g. orthogonal to the coil axes.

Figure 6:
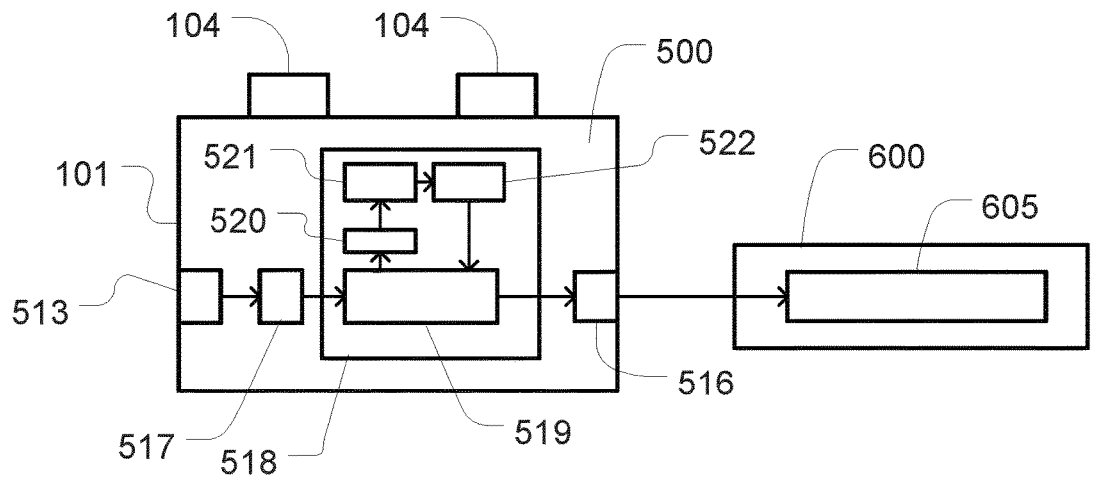
FIG. 6 illustrates another example of an energy source device.

For example, FIG. 6 shows a schematic block diagram of another example of an energy source device. The energy source device 500 of FIG. 6 comprises a housing 101 having coupling members 104, e.g. a housing as described in connection with FIG. 5A.

Moreover, the energy source device of this embodiment comprises, accommodated inside the housing, an energy transfer circuit 518, a wired interface 513, such as a mini USB socket, and an interface 516 for connecting a conductive loop 605 of an external energy distribution device 600.

The energy source device receives electrical energy via the wired interface 513, e.g. in the form of low-voltage (e.g. 5V) DC current. Optionally, the energy source device may further comprise am internal energy storage, e.g. as described in connection with FIG. 5B. Alternatively, the energy source device may be configured to receive energy via a different type of wired or wireless connection.

Optionally, the energy source device comprises a filter 517 operable to block high frequency currents from propagating back through the wired interface and into an energy supply cable, e.g. into a USB cable, as this may be undesirable and cause EMC issues.

The energy transfer circuit 518 is operable to energize the conductive loop 605 of the external energy distribution device 600 with a time-varying current. To this end, the energy transfer circuit 518 may include an H-bridge MOSFET 519 or another suitable drive circuit that receives DC current from the wired interface 513 and creates the current to be fed into the conductive loop via interface 516.

The energy transfer circuit further includes a current measurement circuit 520 operable to sense the loop current fed into the conductive loop 605. The energy transfer circuit further includes control logic 521 and one or more gate drivers 522. The control logic 521 receives information about the actual loop current from the current measurement circuit 520 and is configured to control operation of the gate drivers 522 based on the measured loop current. The gate drivers drive the gates of the H-bridge MOSFET. For example, the energy transfer circuit may be operable to create a sine-wave current in the conductive loop 605 using hard switched MOSFETs using pulse-width modulation or possible a more generic pulse density modulation.

The control logic 521 may be operable to perform some or even all of the following functions:
Take the measurement of the loop current and compare it (amplitude/frequency/phase) to a desired reference current profile.
Calculate any error between the reference current profile and the true loop current.
Calculate and modify the drive signals to the H-bridge MOSFET gates (or control circuits for controlling another type of drive circuit) to dynamically adjust the switching of the MOSFETs to continually correct the loop current to follow to reference current.

Optionally, the control logic 521 may be operable to perform some or even all of the following additional functions:
The control logic may set the reference current (and therefore the resulting loop current) which can be modified either using information stored in the energy source device, transferred from the energy distribution device, inferred from the connections to the energy distribution device, or by information transferred to the energy source device over a suitable communication interface.
The control logic can also implement routing patterns and modify drive currents into different sections of an energy distribution device, e.g. as described in connection with FIGS. 16A-D, 17A-C, 18A-D and 19A-C.
The control logic can implement timed patterns of energy transfer (e.g. transfer energy for a period of time and then possibly leave periodic gaps to allow communication or other functions to be performed that may be hindered by the presence of the energy transfer field).
The control logic may be able to implement shutdown/reduction of the energy transfer field if foreign object detection methods are used.
The control logic may be able to infer the impedance of the conductive loop and use this to infer the presence or absence of objects within the energy transfer zone.
The control logic may use information received from electronic devices in the energy transfer zone to determine the optimal patterns of currents to route through an energy distribution device that allows for multiple loop configurations.
The control logic may be able to signal out to switching devices embedded in an energy distribution device so as to set their current routes.

The energy transfer circuit 518 may further be configured to operate as a communications circuit for effecting contactless communication with electronic devices via the conductive loop 605, e.g. as described in connection with the electronic toy construction elements of FIGS. 1-4. Alternatively or additionally, the energy source device may be configured to communicate with electronic devices in the energy transfer zone via a separate communications link, e.g. via another magnetic communication network or via another electromagnetic radio communication system, such as Bluetooth or similar.

In some embodiments, the energy source device may further include an internal inductive element so as to allow the energy source device to communicate with and/or inductively provide energy to an electronic device directly. Alternatively or additionally, the energy source device may include multiple connectors 516 for allowing of concurrent connection of multiple energy distribution devices. Accordingly, the energy transfer circuit may include multiple driver circuits so as to allow concurrent operation of multiple conductive loops, e.g. multiple external conductive loops or of an internal conductive loop and one or more external conductive loops.

As described in more detail with reference to FIG. 5B, the connector 516 may be a wired connector or a contactless connector, e.g. using an inductive element such as a coil which cooperates with a corresponding inductive element of the energy distribution device 600. In some embodiments the energy distribution device 600 may include its own energy transfer circuit.

Figure 7:
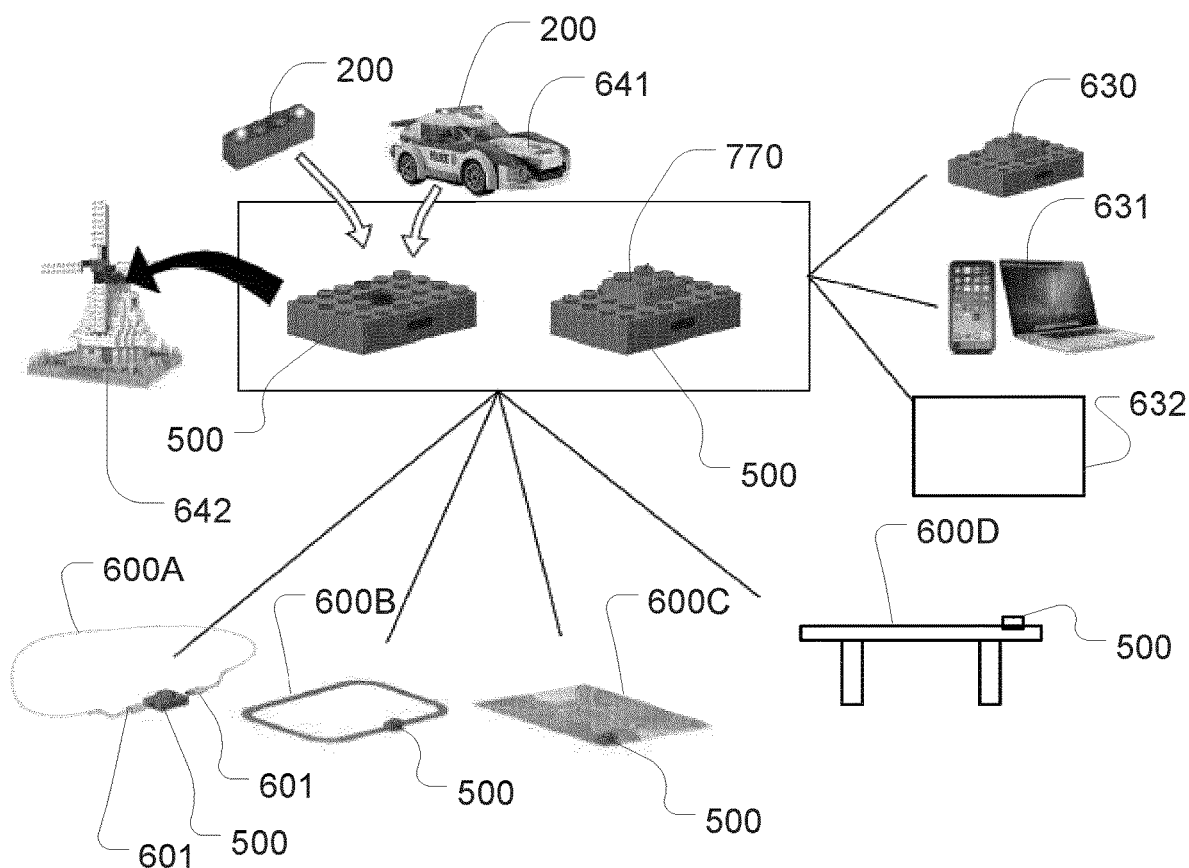
FIG. 7 illustrates an example of a toy system.

FIG. 7 illustrates an example of a toy system. The system comprises one or more energy source devices 500, e.g. as described in connection with FIGS. 5A-B or 6, one or more electronic toy construction elements 200 and a plurality of energy distribution devices 600A-D.

The system may include additional components, e.g. an electronic device 770 connectable to the energy source device for providing additional functions, e.g. additional communications capabilities.

The system may further comprise conventional toy construction elements, from which toy construction models 641 and 642 may be constructed. The toy construction models may include one or more electronic toy construction elements as described herein. For example, the toy construction model 641 may include an electronic toy construction element 200.

The system may further comprise one or more processing devices 631, such as a portable computer, tablet, smart phone and/or the like, or other electronic toys or devices 632.

The energy source device 500 may be used to individually charge individual electronic toy construction elements 200 or one or more electronic toy construction elements incorporated in a small toy construction model 641 that may be positioned in close proximity, e.g. on top of, next to, underneath, the energy source device. In some embodiments, when an electronic toy construction element 200 or a toy construction model 641 are positioned in operational proximity of the energy source device 500, the electronic toy construction element 200 or the electronic toy construction elements of a small toy construction model 641 may contactlessly harvest energy from the energy source device, e.g. so as to charge a rechargeable energy storage of the toy construction elements. The energy may be provided by an internal energy storage of the energy storage device 500 or it may be provided from an external energy source that may be connected to the energy source device 500 via a suitable wire connection. When operated in this manner, the energy source device may be operable as a fast charger allowing fast charging of individual electronic devices.

Alternatively or additionally, the energy source device may itself be incorporated into a toy construction model 642 and provide operational power to one or more electronic toy construction models that are also incorporated in the toy construction model 642 in a sufficient proximity of the energy source device.

Additionally or alternatively, the energy source device 500 may selectively be brought into operational connection with one of the energy distribution devices 600A-D. In particular, each of the energy distribution devices 600A-D may include a conductive loop that defines an energy transfer zone. When the energy source device 500 is operationally connected, e.g. via a conductive, physical connection or contactlessly, to an energy distribution devices, the energy source device may energize the conductive loop of the operationally connected energy source device so as to create a time-varying electromagnetic field in an energy transfer zone defined by the conductive loop of the energy distribution device. Accordingly, one or more electronic toy construction elements or other electronic devices may harvest energy from the energy source device when they are positioned in the energy transfer zone, e.g. within the surface area surrounded by the conductive loop, or at least in sufficient proximity to the conductive loop, e.g. within a sufficient volume above or below the conductive loop.

Generally, some embodiments of the energy source device may not include an inductive element for contactless energy transfer, but merely be connectable to one or more energy distribution devices so as to provide contactless energy transfer via the one or more energy distribution devices.

As illustrated in FIG. 7, the energy source device may be selectively connected to a variety of different energy distribution devices, such as a wire loop 600A that can be connected to the energy source device via suitable electrical connectors 610, a loop 600B formed from a flexible material or from a plurality of interconnectable modules, or a mat 600C, piece of furniture, such as a table 600D or other product having an embedded conductive loop. Examples of energy distribution devices will be described in more detail with reference to FIGS. 10-15, 16A-D, 17A-C, 18A-D and 19A-C.

The energy distribution devices may but do not need to include their own energy storage or energy transfer circuit, but may simply include a suitable conductive loop that can be energized by the energy source device and that defines an energy transfer zone.

Accordingly, even a single energy source device may be used to define energy transfer zones of a variety of different shapes and sizes which may accommodate and transfer energy to different numbers of electronic devices at different rates.

The energy source device 500 may further be operable to communicate with other devices, e.g. other energy source devices 630, electronic data processing devices 631 or other devices 632 capable of wireless communications. Accordingly the energy source device may be operable as a communications gateway between electronic devices of the system and external devices.

It will thus be appreciated that embodiments of the contactless energy transfer system described herein may be a modular system that can work (e.g. through internal batteries of the energy source device and/or the electronic devices) free of external connections. The system's energy source device can be recharged, powered by battery, or powered by connecting to external power source. The energy source device may be used to charge or energize individual electronic toy construction elements or models. In this mode, the energy source device may be operable as a fast charger operable to provide fast charging within its own small footprint of charger-only size. Alternatively or additionally, the energy source device may be operationally connected—either through direct electrical connection, capacitively or inductively—to an external energy distribution device which includes a conductive loop or loops so as to create a bigger energy transfer zone. Such energy transfer zone can sit below, to the side and/or above the play area. The loop can be formed as a coiled wire, and it may be embedded within a play mat, a toy construction element or model, a table, or any variety of other materials and surfaces. Moreover additional loops may be added and/or the wire thickness may be selected so as to allow the energy source device to be designed for specific power sources (unnegotiated USB, batteries etc.) whilst also minimizing the complexity of the required electronics.

Figure 8:
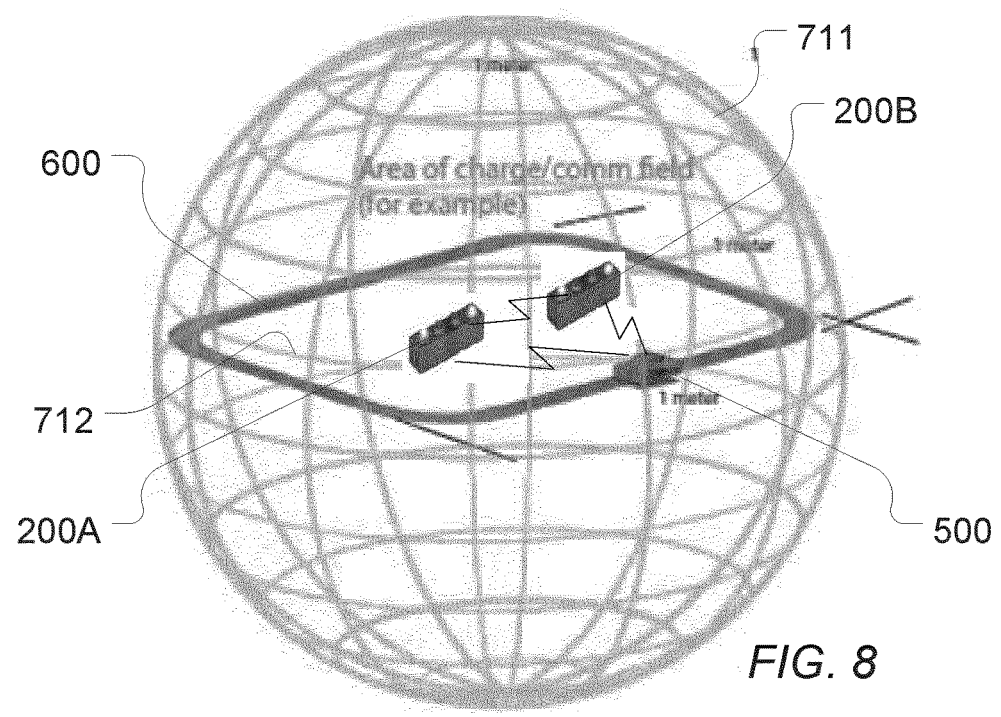
FIG. 8 illustrates another example of a toy system.

FIG. 8 illustrates another example of a toy system. The system comprises one or more energy source devices 500, e.g. as described in connection with FIGS. 5A-B or 6, two or more electronic toy construction elements 200A-B and an energy distribution device 600.

As already discussed above, the energy source device 500 may be connected to a variety of different energy distribution devices, such as a loop 600 formed from a flexible material or from a plurality of interconnectable modules. The conductive loop 600 defines an energy transfer zone 711. It will be appreciated that, generally, the size of the energy transfer zone also depends on the electric current through the conductive loop which in turn is controllable by the energy source device. When the energy source device 500 is operationally connected to the conductive loop 600, the energy source device energizes the conductive loop so as to create a time-varying electromagnetic field within the energy transfer zone 711. Accordingly, electronic devices 200A and 200B may harvest energy from the generated time-varying electromagnetic field when they are placed in the energy transfer zone 711, in particular within the area 712 surrounded by the loop 600 or within a suitable volume above and/or below the energy transfer zone.

It will be appreciated that different energy distribution devices may provide energy transfer zones of different shapes and sizes. While a specific example of an energy distribution device is illustrated in FIG. 8, it will be appreciated that other types of energy distribution devices, e.g. any one of the examples shown in FIGS. 9A-E, 10-15, 16A-D, 17A-C, 18A-D and 19A-C, may be used instead.

In this manner energy transfer zones of varying shapes and sizes may be defined, e.g. zones having an extent of 10 cm or more in each direction, such as 50 cm or more, such as 1 m or more. Accordingly, several electronic devices 200A-B may be positioned within the energy transfer zone at the same time and may thus concurrently harvest energy.

Nevertheless, the energy harvesting efficiency may depend on the size of the energy transfer zone and on the number of devices that concurrently harvest energy.

In some embodiments, the electronic devices 200A-B may be operable to communicate with each other and/or with the energy source device. For example, the energy transfer circuit of the energy source device and the energy receipt circuits of the electronic devices may be operable to provide contactless communication via the electromagnetic field. To this end, the energy transfer operation may be interrupted from time to time so as to allow for data exchange.

Accordingly, the electronic devices may exchange information about their respective charging states and/or about their recent use statistics and/or their preferred or required charging currents/powers. Alternatively or additionally, the electronic devices may transmit this information to the energy source device. Based on this information the electronic devices may negotiate energy transfer settings, e.g. the desired loop current, whether energy transfer should be started, and a duration of the energy transfer and/or the like. In some embodiments, the energy source device may be able to selectively provide energy transfer in different energy transfer zones or provide energy transfer at different rates within different zones, e.g. as described in connection with FIGS. 16A-D, 17A-C, 18A-D and 19A-C. In such embodiments, the energy source device may selectively control the energy transfer based on the communicated information, e.g. so as to initially provide energy transfer (and/or energy transfer at a higher rate) to an electronic device with frequent expected use and/or with small charging state.

Alternatively to a negotiation between the electronic devices, the energy source device may compute suitable energy transfer settings based on information received from the electronic devices and, optionally, information about its own charging state.

Accordingly, some embodiments of the contactless charging system have the ability to charge individual electronic devices depending on need and overall system load. The devices can communicate between themselves and/or with the energy source device so as to determine an optimal energy transfer configuration for the population of devices given based on parameters such as their position relative to the energy transfer zone, their current charge level, their usage history, and/or the like. To this end, the energy transfer may be duty cycled to allow coexistence with contactless communications. Alternatively, the communications may be performed via a separate channel, e.g. magnetic or radiative.

FIGS. 9A-E illustrates further examples of a toy system. The systems each comprise an energy source device 500, e.g. as described in connection with FIGS. 5A-B or 6, and an energy distribution device 600.

Figure 9A:
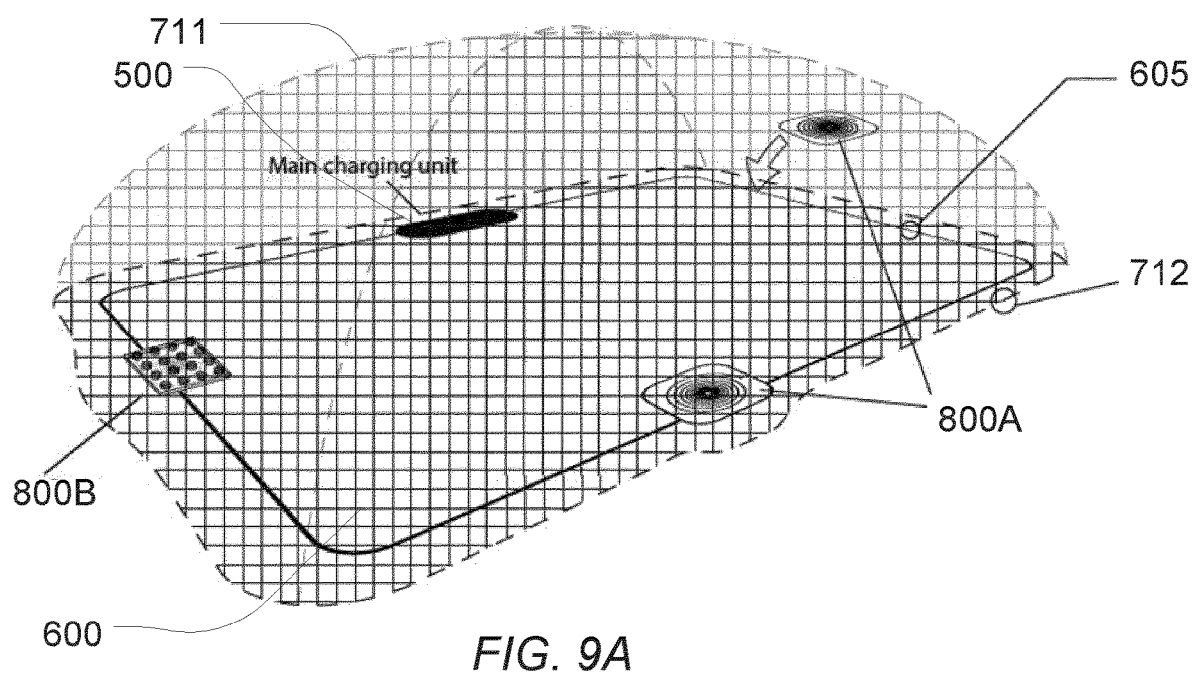
FIGS. 9A-E illustrates further examples of a toy system.

As already discussed above, the energy source device 500 may be connected to a variety of different energy distribution devices, such as a device comprising a conductive loop 605 formed from a flexible material or from a plurality of interconnectable modules. The conductive loop 605 surrounds a loop area 712 at it defines an energy transfer zone 711. When the energy source device 500 is operationally connected to the conductive loop 605, the energy source device energizes the conductive loop so as to create a time-varying electromagnetic field extending throughout the energy transfer zone 711. Accordingly, electronic devices may harvest energy from the generated time-varying electromagnetic field when they are placed in the loop area 712 surrounded by the loop 605 or within a suitable volume 711 above or below the loop area. It will be appreciated that, as is illustrated in FIGS. 9A and 9E, energy transfer may also occur, when an electronic device is positioned slightly outside the loop area delimited by the conductive loop, i.e. the energy transfer zone 711 may extend outside the loop 605. Generally for the purpose of the present description, the term energy transfer zone will be used to refer to a 3D volume in a proximity of the conductive loop where energy transfer is operational to a useful extent.

In the embodiment of FIG. 9A, the system further comprises auxiliary energy distribution devices 800A-B, respectively. Each of the auxiliary energy distribution devices comprises a conductive loop that defines an auxiliary energy transfer zone, smaller than the primary energy transfer zone 711 defined by the loop 605. When the auxiliary energy distribution devices 800A-B are brought into operational connection—by physical, electric connection, capacity and/or inductive—with the primary conductive loop 605, their loops are energized by the conductive loop 605. Consequently, they create a time varying electromagnetic field within a proximity of the auxiliary energy transfer zone. Hence, these auxiliary energy transfer zones may be used to extend the total energy transfer zone and/or so as to provide localized fast charging hot spots, e.g. when the auxiliary energy distribution devices provide loops having a relatively high number of turns. Such added loops or coils can be integrated into plastic or other types of housing 800A including cardboard, vinyl, etc. They can also be included within a toy construction system platform such as a toy construction element, e.g. as illustrated by element 800B.

Figure 9B:
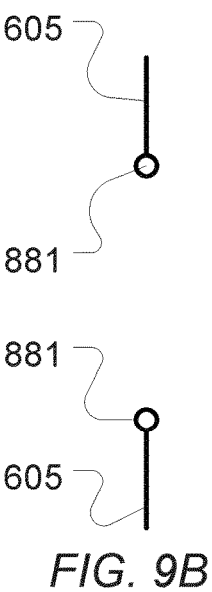
Figure 9C:
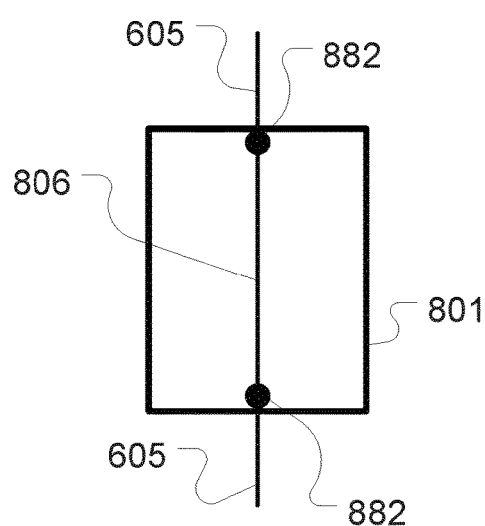
Figure 9D:
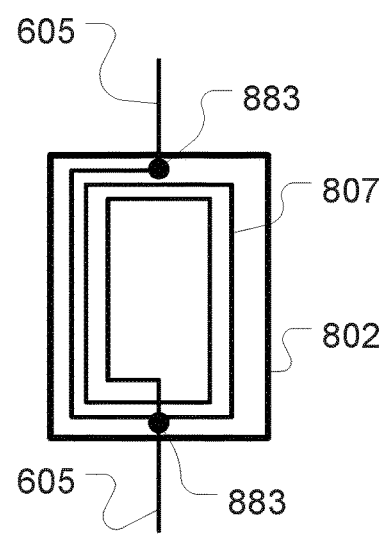
Figure 9E:
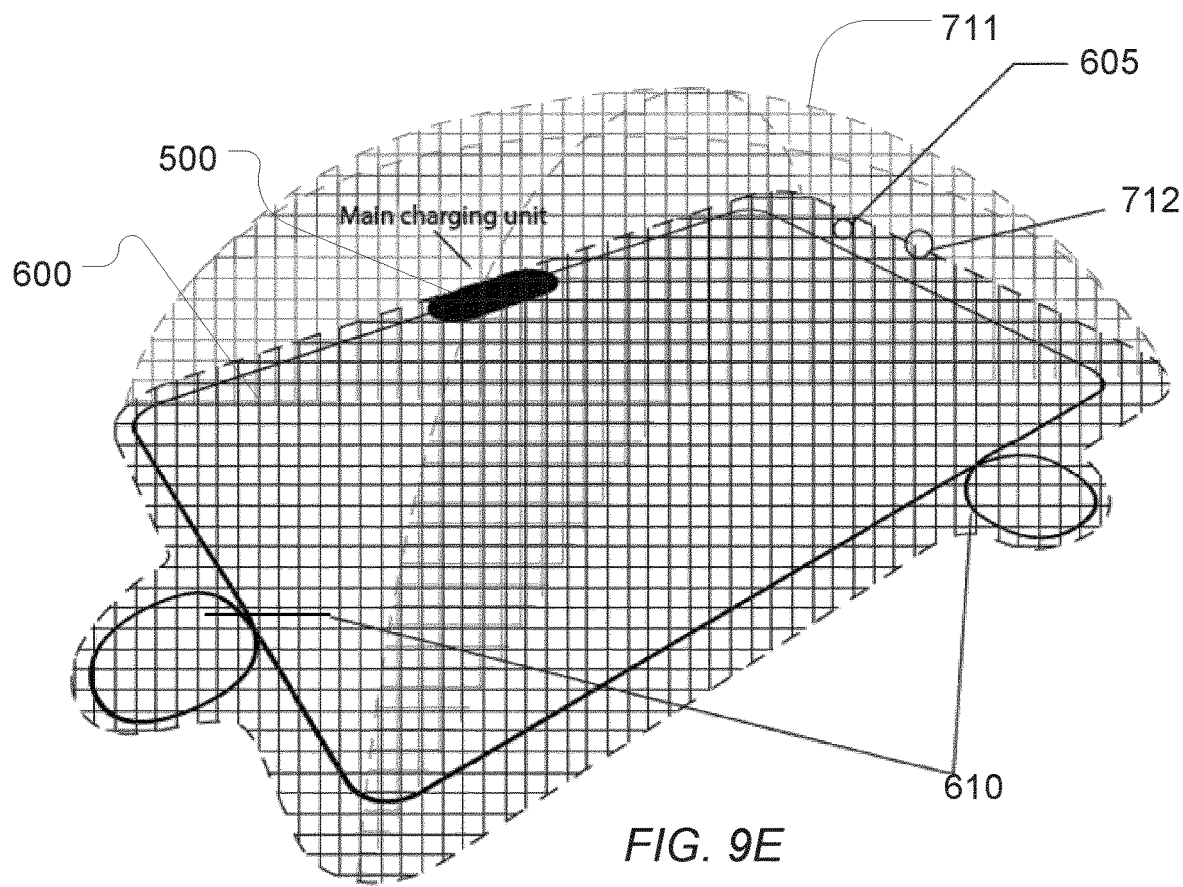

FIGS. 9B-D illustrate how such auxiliary energy distribution devices may be operationally connected to a primary conductive loop.

FIG. 9B illustrates a section of a primary conductive loop 605. The loop 605 is interrupted by a gap where the respective ends of the loop terminate in connectors 881.

FIG. 9C illustrates a first auxiliary energy distribution device 801 inserted into the gap. The first energy distribution device has the form of a plate which comprises a straight conductive path 805 which terminates in respective connectors 882 at opposite ends of the auxiliary energy distribution device. Hence, when the second auxiliary energy distribution device 801 is inserted into the gap, its conductive path completes the loop 605.

FIG. 9D illustrates a second auxiliary energy distribution device 802 inserted into the gap. The second energy distribution device has the form of a plate which comprises conductive path 807 forming a small loop and whose ends terminate in respective connectors 883 at opposite ends of the auxiliary energy distribution device. Hence, when the second auxiliary energy distribution device 802 is inserted into the gap, its conductive path not only completes the loop 605 but also defines an auxiliary energy transfer area having a relatively high field strength so as to provide an energy transfer hot spot in addition to the energy transfer zone defined by the primary loop 605.

The auxiliary energy distribution devices 801 and 802 may e.g. be formed as plates, e.g. as illustrated by element 800B of FIG. 9A. The plates may have coupling members on their bottom faces that are compatible with mating coupling members on a top surface of the carrier sheet in the gap between the connectors 881, so as to allow accurate positioning and reliable attachment of the auxiliary energy distribution devices 801 and 802 onto the carrier sheet. The connectors 881, 882 and 883 may be incorporated into one or more of the coupling members, or they may be formed as separate connectors. The coupling members may be compatible with a toy construction system, e.g. as described in connection with the coupling members of the energy source device of FIGS. 5A-B and 6.

In the example of FIG. 9E, such hot spots are permanently incorporated into the conductive loop of the primary energy distribution device, e.g. by providing areas of high conductive loop density 610.

Hence, in some embodiments, the toy system provides fast energy transfer zones, e.g. by providing smaller diameter conductive loops that can be designed within a conductive coil loop design or by a user placing a standalone tight coil loop either directly connected or through inductive/capacitive over the existing coil to get a quick energy transfer zone. This fast energy transfer zone may be used to concentrate the conductive charging signal and can in some respects extend the physical charging area. The system may be able to adjust the power delivery to the fast charge areas depending on the load.

Fast energy transfer zones can be used not only for fast charging but can also be used to extend or increase the play arena. Secondary coils for example can be integrated into base plates.

Those base plates can go beyond the planar charging area and create extended charging areas.

FIGS. 10-14 illustrate different embodiments of energy distribution devices.

Figure 10:
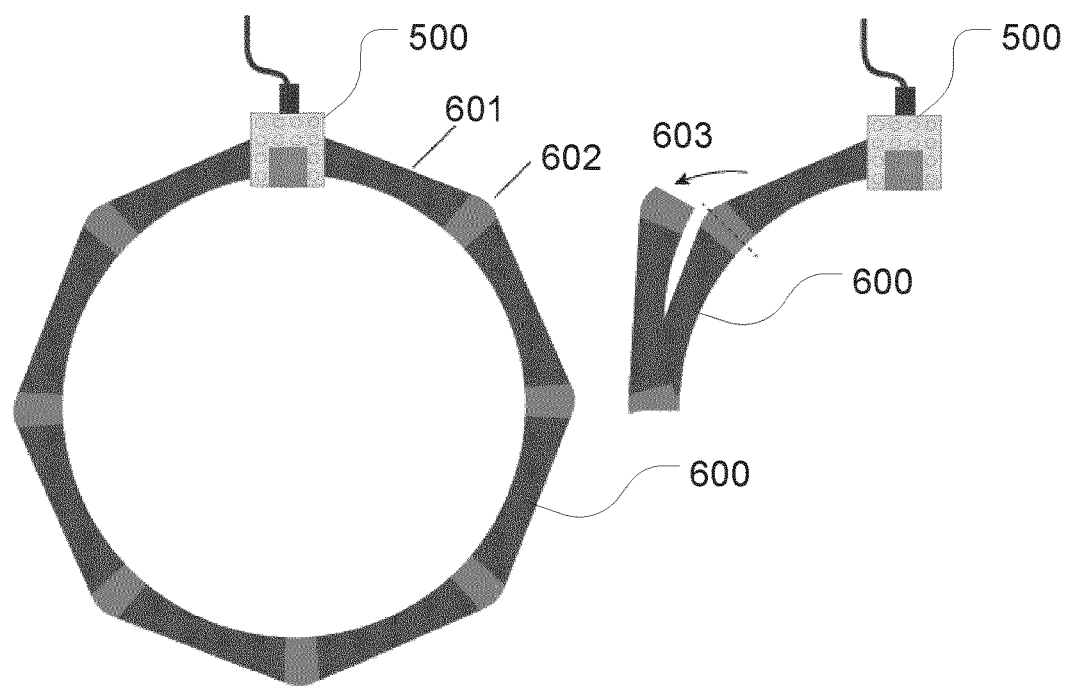
FIGS. 10-15 illustrate different embodiments of energy distribution devices.

FIG. 10 illustrates an energy source device 500 attached to an energy distribution device 600 in the form of a loop formed from an alternating sequence of rigid, elongated loop segments 601 and flexible hinge parts 602 which may e.g. be made from silicone or other bendable material. The loop has embedded in it an integrated conductive path that extends along the length of the loop. As illustrated in FIG. 10, the loop may be folded into a collapsed state for convenient storage and unfolded for use, as illustrated by arrow 603. The loop 600 may be mechanically and electrically connected to the energy source device 500. Alternatively, the energy source device 500 may be coupled capacitively and/or inductively to the loop. In one embodiment the hinge parts 602 may be formed as detachable hinged connectors so as to allow the loop segments to be disconnected from each other.

Figure 11:
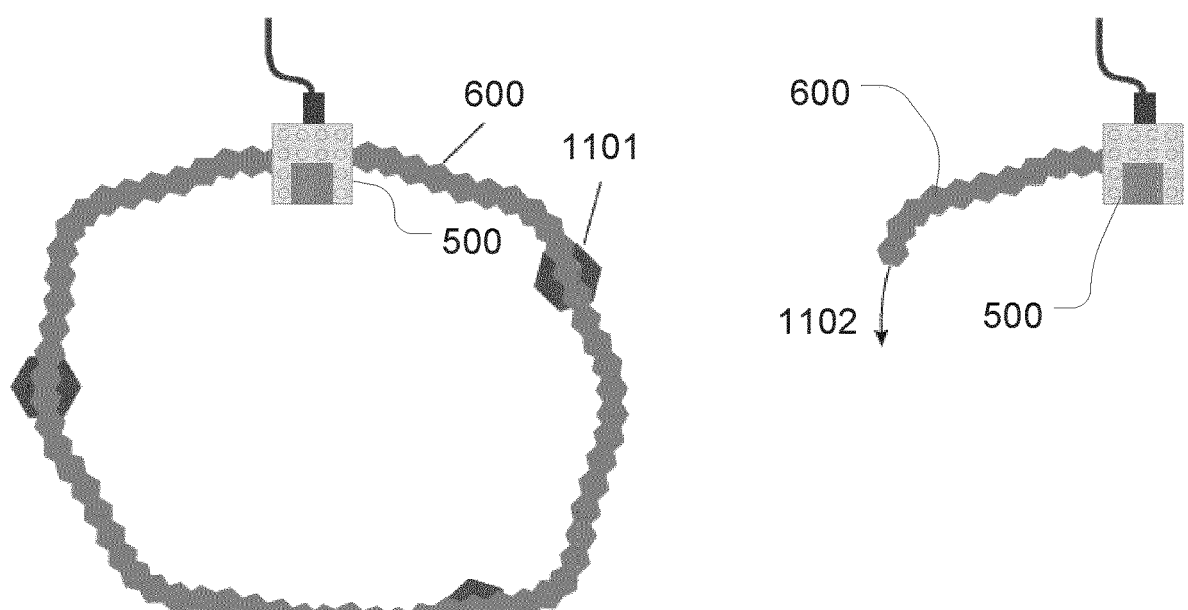

FIG. 11 illustrates another example of energy source device 500 attached to an energy distribution device 600. In the example of FIG. 11, the energy distribution device has the form of a flexible or bendable elongated band or ribbon 600. The ribbon or band may be made from silicone or another suitable material and it includes an embedded conductive path extending along the length of the ribbon. One end of the ribbon may be connected to a spool which is accommodated in the housing of the energy source device 500. Alternatively, the spool may be provided in a separate housing that is connectable, e.g. electrically and mechanically, to the housing of the energy source device. When the ribbon is wound up on the spool, the ribbon is accommodated within the housing for storage. The user may withdraw the ribbon from the spool, as indicated by arrow 1102, so as to form an external conductive loop. To this end, the free end of the ribbon may include a connector for mechanical and electrical connection of the free end with the energy source device 500 or with a separate spool housing, as the case may be. The system may further comprise a number of support elements 1101 that may be clipped onto the ribbon. For example, the support element may include coupling members compatible with a toy construction system so as to allow attachment of the supports on a base plate or otherwise on a toy construction model.

Figure 12:
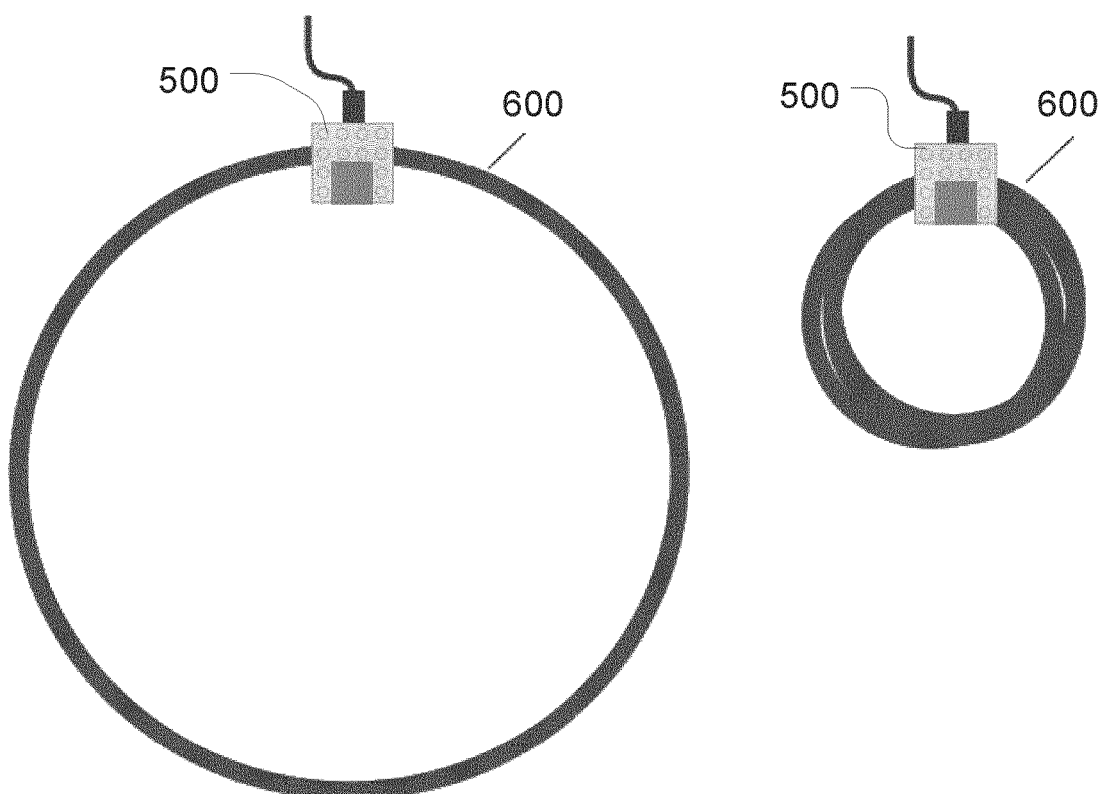

FIG. 12 illustrates another example of energy source device 500 attached to an energy distribution device 600. In the example of FIG. 12, the energy distribution device has the form of a flexible or bendable loop or ribbon 600. The loop may be made from a suitable material that allows the loop to be twisted and folded as illustrated on the right side of FIG. 11. Both ends of the loop are electrically and mechanically connected to the energy source device and the loop includes a conductive path extending along the length of the loop. Alternatively, the energy source device 500 may be coupled capacitively and/or inductively to the loop. The loop may be twisted into an 8-shape forming two partial loops. Then the loop may be folded such that the two partial loops come to rest on top of each other. Hence, twisted and folded loop forms a double loop which defines a small energy transfer zone within which efficient energy transfer may be achieved. The twisting and folding process may even be repeated so as two create a 4-fold loop. Also, in the folded state the device may be conveniently stored when not in use. In the unfolded state shown on the left side of the figure, the loop defines a large energy transfer zone which may accommodate a larger number of electronic devices.

Figure 13:
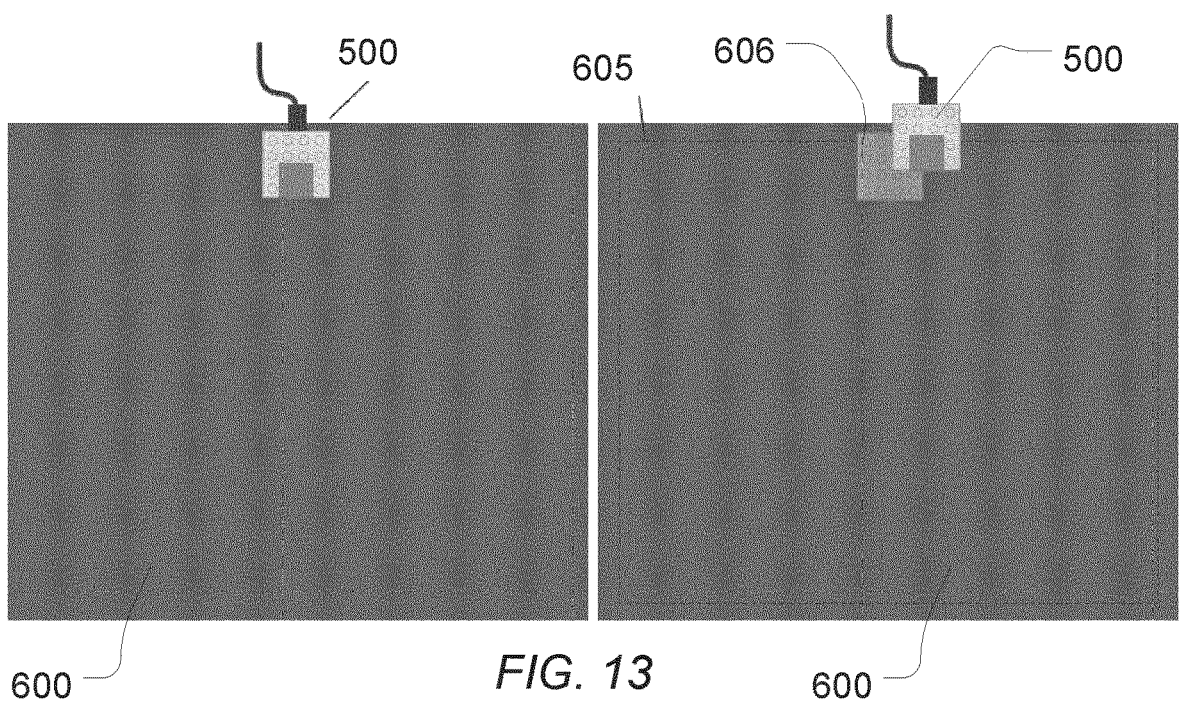

FIG. 13 illustrates another example of an energy source device 500 attached to an energy distribution device 600. In this example, the energy distribution device is in the form of a rigid plate or flexible mat having a conductive loop 605 embedded along its periphery. For example, the energy distribution device 600 may be part of a piece of furniture such as a table, or it may be a play mat or a base plate of a toy construction system.

Figure 14:
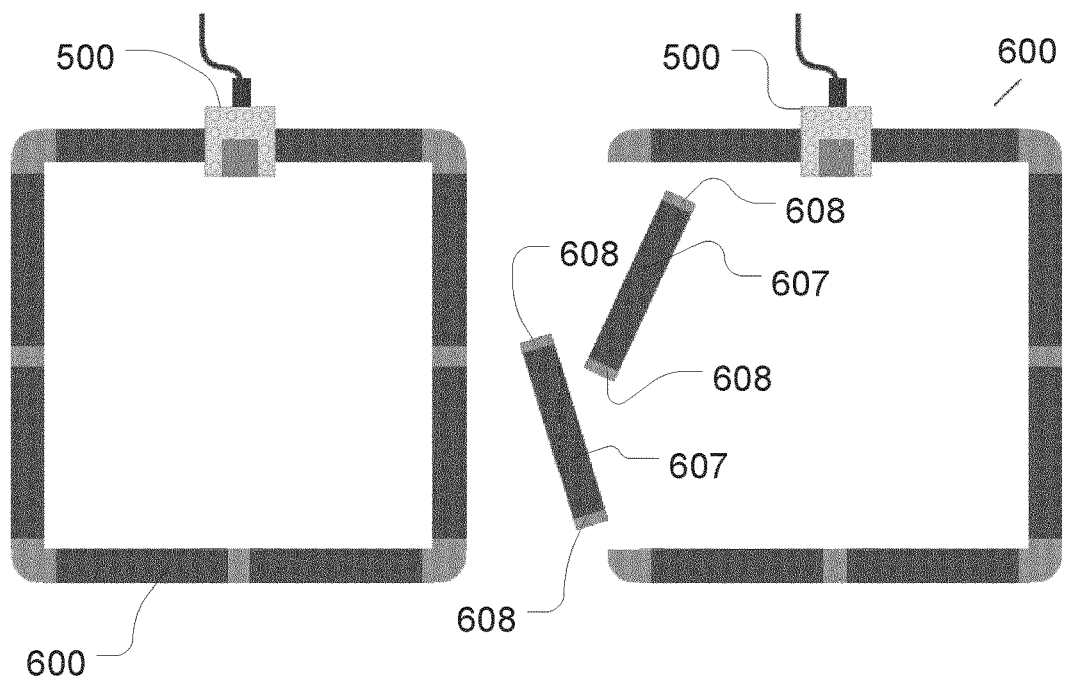

FIG. 14 illustrates another example of an energy source device 500 attached to a modular energy distribution device 600 in the form of a loop formed from mutually interconnected loop segments 607. The loop segments 607 of the example of FIG. 13 are elongated, stiff elements having coupling members 607 at their respective ends so as to provide a mechanical and electrical connection with neighbouring loop sections. It will be appreciated that other examples of loop sections may have different shapes, such as arcuate, and/or they may be made from a flexible or bendable material. In any event, each loop section includes one or more conductive paths extending along the length of the loop sections, such that the conductive paths of the loop sections together form a conductive loop when the loop sections are interconnected so as to form a closed loop. The energy source device may be integrated into the loop as another loop section or it may otherwise mechanically and/or electrically be connected to the loop. Alternatively, the energy source device 500 may be coupled capacitively and/or inductively to the loop. The modular loop sections may be interconnected so as to form loops of varying sizes and shapes depending on the user's needs.

Figure 15:
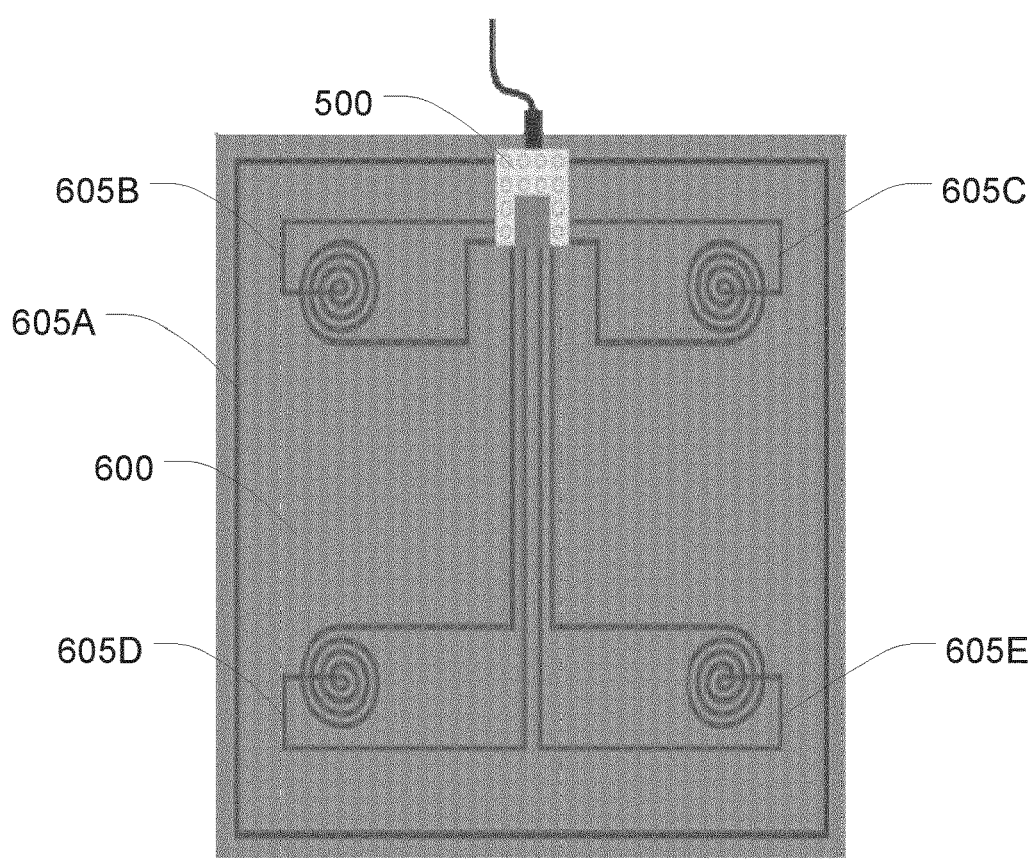

FIG. 15 illustrates an energy source device 500 attached to an energy distribution device 600 in the form of a carrier sheet, such as a mat or plate, including a plurality of conductive loops 605A-E. The energy source device 500 may be mechanically connected to the mat or plate and electrically connected to the respective conductive loops of the energy distribution device. To this end, the energy source device may include multiple connectors. Alternatively, the energy source device 500 may be coupled capacitively and/or inductively to the loops 605A-E.

The energy distribution device of this embodiment allows energy transfer zones of different shapes and/or sizes and/or locations on the sheet to be activated, and/or energy transfer fields of different intensities to be activated within the area of the energy distribution device 600.

The energy source device 500 may activate one or more of the individual loops 605A-E concurrently. In some embodiments, the energy transfer circuit of the energy source device 500 may be operable to only energize a single loop at the same time. Accordingly, the energy source device may include one or more switches configured to switch between the loops that are energized. Alternatively, the energy transfer circuit of the energy source device 500 may be operable to energize more than one loop at any one time. To this end, the energy transfer circuit may include multiple driver circuits, e.g. multiple H-bridges.

Figures 16A, 16B, 16C, 16D:
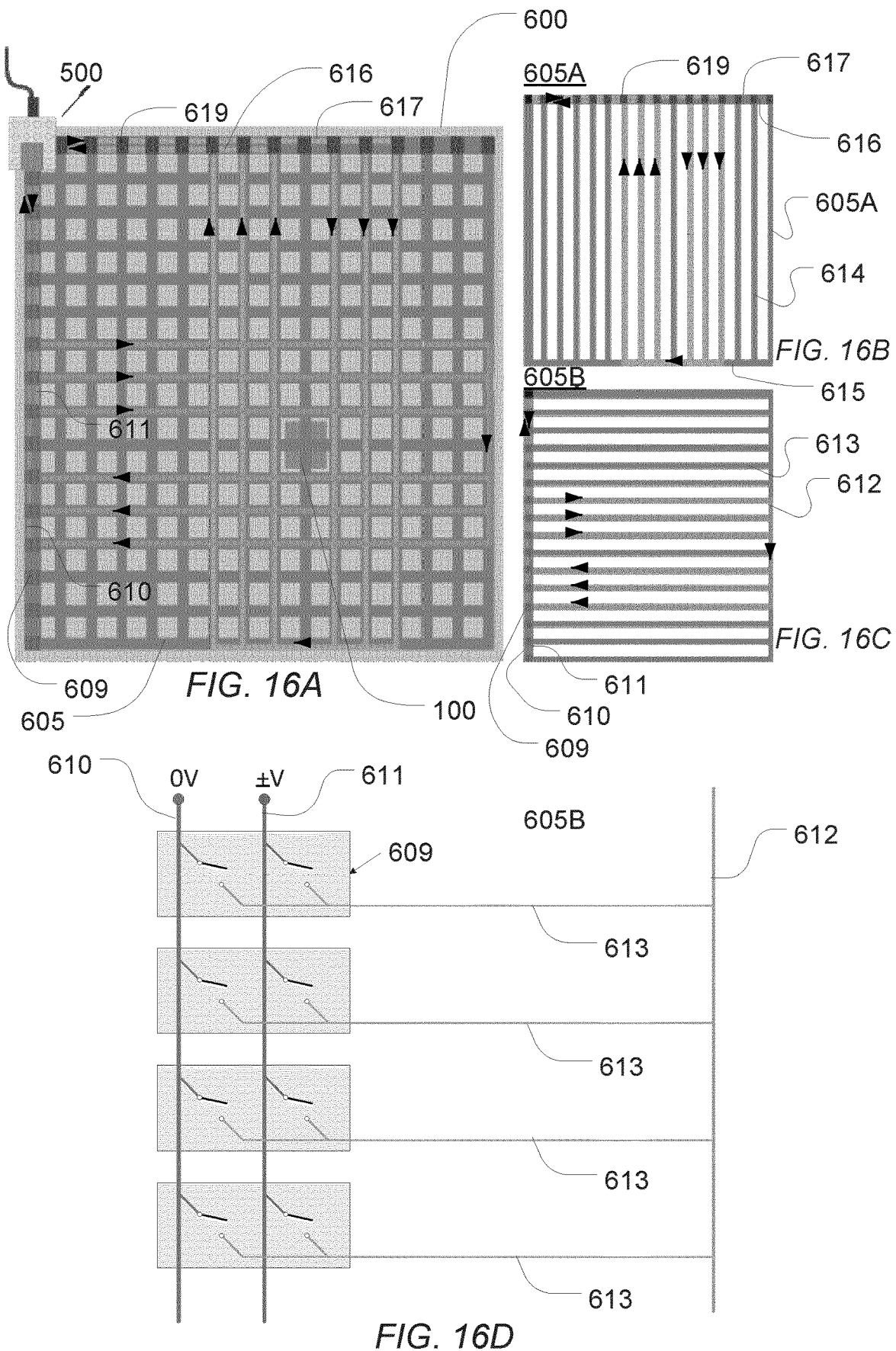
FIGS. 16A-D illustrate yet another embodiment of an energy distribution device.

FIGS. 16A-D illustrate an energy source device 500 attached to an energy distribution device 600 in the form of a carrier sheet, such as a mat or plate, including a grid of conductive paths 605, most easily visible in FIG. 16A. The energy source device 500 may be mechanically connected to the mat or plate and electrically connected to the grid 605. To this end, the energy source device may include multiple connectors. Alternatively, the energy source device 500 may be coupled capacitively and/or inductively to the loops 605A-E. In some embodiments, the energy source device may even be permanently connected to, or otherwise integrated into the carrier sheet.

In particular, in the example of FIGS. 16A-D, the energy distribution device includes a first subset 605A of conductive paths and a second subset 605B of conductive paths where each of the first subset of conductive paths crosses the conductive paths of the second subset. At the positions where conductive paths of the respective subsets cross each other, the conductive paths of the first subset are electrically insulated from the conductive paths of the second subset. To this end, the energy distribution device is formed as a layered structure including a first layer and a second layer, separated by an insulating layer. The first layer includes the first subset 605A of conductive paths while the second layer includes the second subset 605B of conductive paths. However, it will be appreciated that other structures are possible. In the example of FIG. 16A, the conductive paths of each subset include parallel paths which are arranged equidistantly from each other and which extend substantially across the entire width of the carrier sheet. The parallel portions of the conductive paths of the first subset extend across, such as at right angles relative to the parallel portions of the conductive paths of the second subset. It will be appreciated that other grid patterns are possible as well. For example, the conductive paths may be arranged at different densities, at different angles relative to each etc. Similarly, the crossing path sections do not have to be straight. For example, in one alternative grid pattern, a first subset of conductive paths may include radial portions that extend radially outward from a common centre, e.g. like spokes of a wheel. The conductive paths of the second subset may include circumferential sections arranged at respective radial distances from the centre, thus resulting in a circular grid pattern resembling a spider-web.

FIG. 16A illustrates the entire structure of an example of an energy distribution device, while FIG. 16B illustrates an example of a path layout of the first layer and FIG. 16C illustrates an example of a path layout of the second layer. FIG. 16D illustrates how the conductive paths of the second subset 605B are electrically interconnected.

The first layer includes conductive paths 614 extending along a first direction while the second layer includes conductive paths 613 extending along a second direction, across the first direction. The two layers are electrically insulated from each other by an insulating layer (not explicitly shown). Hence, even though the conductive paths 613 and 614 cross each other, they are not short-circuited with each other at the crossing points.

The energy distribution device 600 comprises a first set of switches 619 for switching the first set of conductive paths 605A and a second set of switches 609 for switching the first set of conductive paths 605B. The second set of switches 609 are most clearly seen in FIG. 16D. In the present example, the switches are arranged along a first edge of the carrier sheet. The switches are individually controllable by the energy source device, e.g. via a suitable control line or bus (not shown).

The switches 609 allow one end of each of the straight conducting path sections 613 to be connected to either high potential (+/−V volts), to low potential (0V) or left at high impedance/disconnected. There is a bus going past the switches to allow the +/−V and 0V rails 611, 610, respectively to reach each switch. The rails 610 and 611 run along one edge of the layer 605B.

The respective other ends of the conducting paths 613 of the second layer 605B are all shorted together by conductor 612 that runs along one edge of the layer 605B opposite the edge along which the switches 609 and the bus rails 610 and 611 are located, i.e. the conducting paths 613 extend between the side of the layer where the switches 609 are arranged and the opposite side along which the conductor 612 extends. The energy source device 500 is configured to control switches 609 to be selectively set to the desired connection (to +/−V, to 0V or disconnected) to route currents around a selected area of the layer 605B. An example of a possible routing pattern is illustrated in FIGS. 16A-C by arrows.

The first layer 605A is arranged in a corresponding fashion but rotated 90 degrees relative to the second layer 605B. Hence, the first layer also comprises straight conducting path sections 614 extending between opposite edges of the carrier sheet. The path sections 614 are shortened together along one edge by conductor 615 and connectable to respective rails 616 and 617 by a sequence of switches 619 arranged along the opposite edge.

Hence, the switches of the respective layers are controllable by the energy source device so as to create the optimal energy transfer field by the superposition of the fields generated by each layer. Different routing patterns may thus be defined by different settings of the various switches.

Different routing patterns may cause current to surround different areas of the carrier sheet and/or routing patterns may involve different numbers of conducting paths.

In the example of FIGS. 16A-D, a single electronic device 100 is positioned on the carrier sheet of the energy distribution device 600. In the example of FIGS. 16A-C, the energy source device has controlled the switches of the energy distribution device such that the position of the electronic device 100 is surrounded by loop currents through a subset of the conductive paths of the first layer and through a subset of the conductive paths of the second layer. The directions of the currents at a given point in time are indicated by arrows in FIGS. 16A-C.

Figures 17A, 17B, 17C:
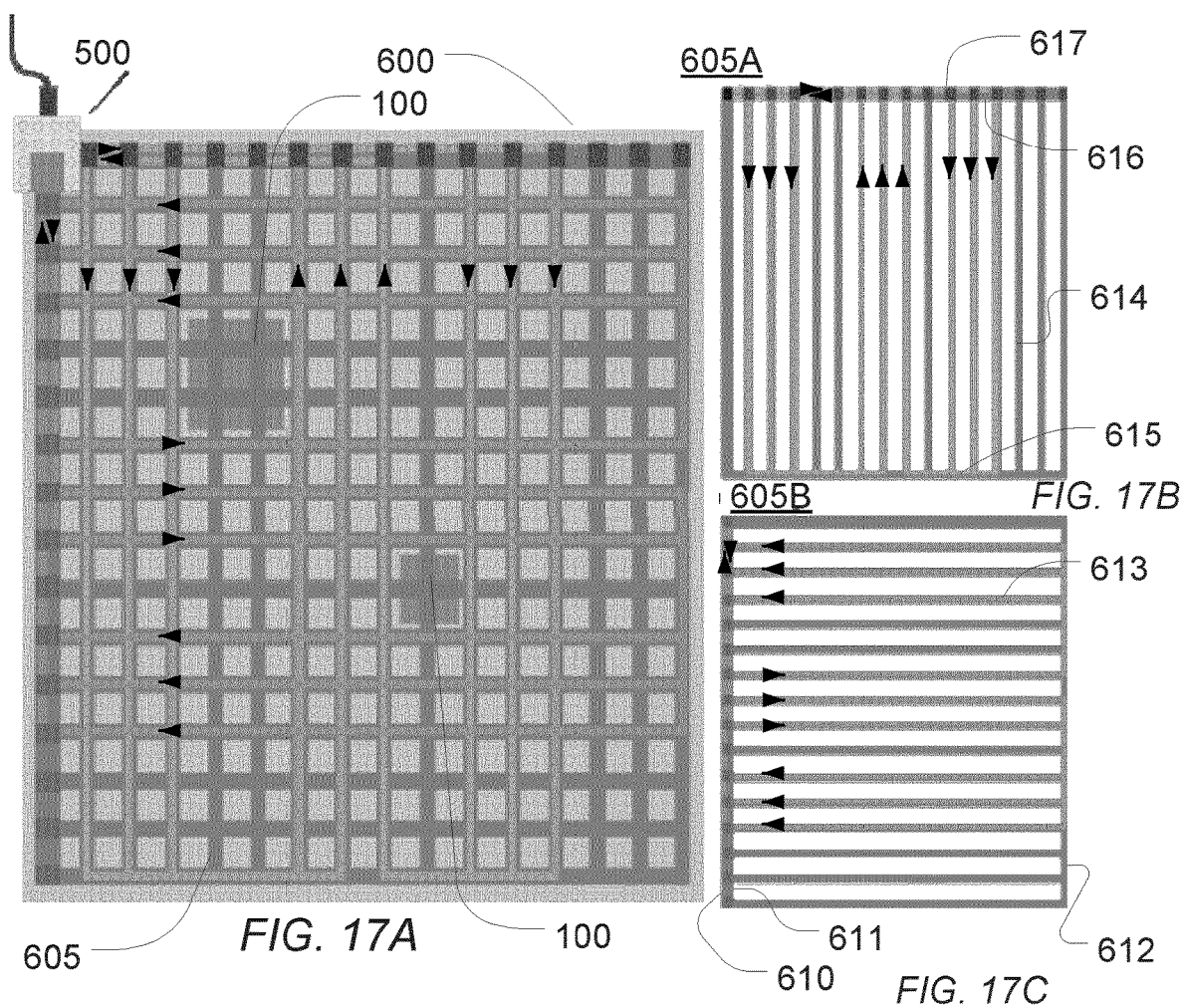
FIGS. 17A-C illustrate an example of operating the energy distribution device of FIGS. 16A-D.

FIGS. 17A-C indicate the energy distribution device of FIGS. 16A-B but where two electronic devices 100 are positioned on the carrier sheet of the energy distribution device 600, and where the energy source device 500 has controlled the switches 609 and 619 of the energy distribution device so as to create optimal energy transfer zones at the respective locations of both electronic devices, as indicated by arrows in FIGS. 17A-C.

To this end, the energy source device 500 and/or the electronic devices 100 may determine where the electronic devices are positioned on the energy source device 600. It will be appreciated that this detection may be performed in a number of ways. For example, an electronic device may detect its position relative to the carrier sheet and/or relative to the conductive paths and communicate this information to the energy source device. In some embodiments, an electronic device may sense the currents and/or power from the conductive paths of the carrier sheet as the energy source device selectively energizes respective conductive paths, e.g. during an initial scanning operation where the energy source device sequentially energizes different paths in a predetermined scanning pattern or in an adaptive scanning patterns, e.g. responsive to feedback received from the electronic devices. The electronic device may then communicate information to the energy source device so as to alert the energy source device of at which time during the scan the electronic device has sensed the highest current/power. From this information the energy source device can determine at least an approximate position of the electronic device relative to the carrier device and control the switches so as to create a current routing pattern to satisfy all of the detected electronic devices identified at various positions.

Figure 18A:
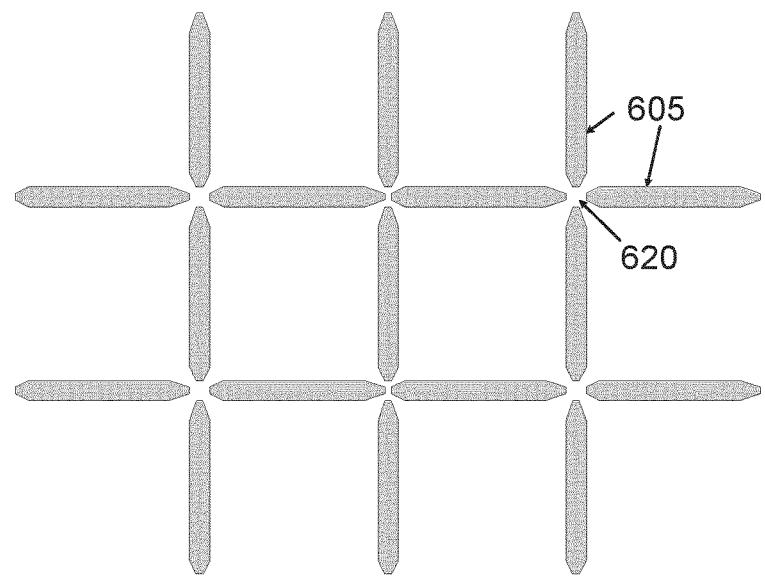
FIGS. 18A-D illustrate yet another embodiment of an energy distribution device.
Figure 18B:
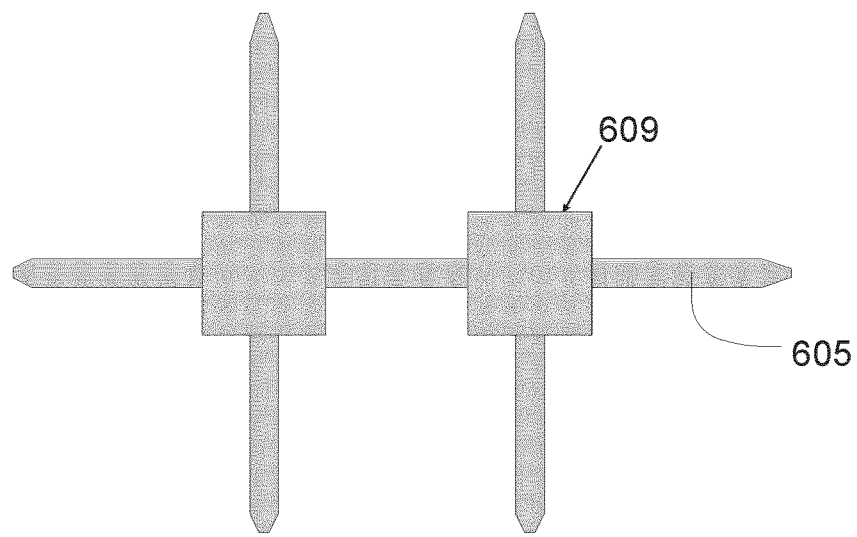
Figure 18C:
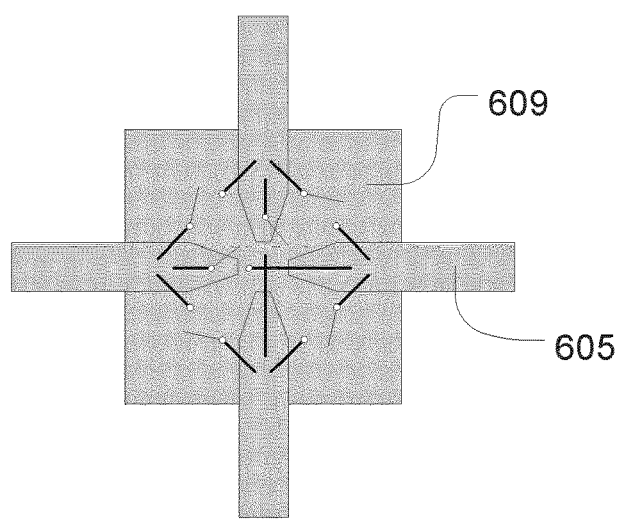
Figure 18D:
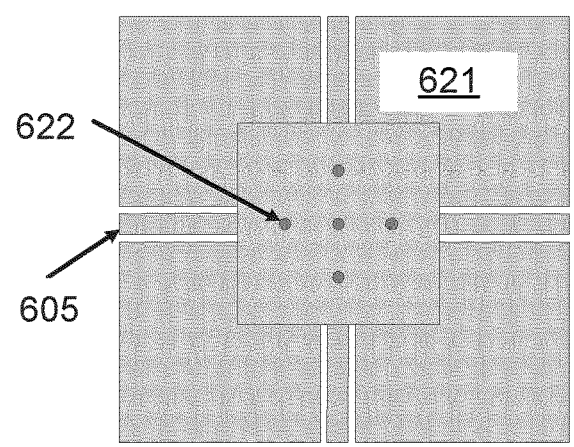

FIGS. 18A-D illustrate another example of an energy distribution device 600 in the form of a carrier sheet, such as a mat or plate, including a grid of conductive paths 605, similar to the embodiment of FIGS. 16A-D and 17A-C. In particular, FIG. 18A illustrates a portion of the grid structure of conducting paths embedded into the carrier sheet while FIGS. 18B-D illustrate the switches used for selecting a pattern of currents through the grid. As can most easily be seen in FIG. 18A, the conductive paths 605 of this embodiment do not extend across the entire carrier sheet but they only extend across a unit cell of the grid. The conductive paths are electrically isolated from each other at each grid node 620 where the conductors would otherwise intersect.

Instead, as illustrated in FIG. 18B, the energy distribution device includes a switching device 609 at each of the grid nodes. Each switching device is configured to selectively route currents from one incoming conductor into any of the others, e.g. as illustrated by the switch arrangement shown in FIG. 18C.

The energy distribution device of FIGS. 18A-D may be implemented as a two-layer structure including a dedicated ground layer. However, as illustrated in FIG. 18D, in some embodiments, the ground layer 621 may be implemented by the same layer as the conducting paths 605. The conductors are then connectable to the switch by connection points 622.

Figures 19A, 19B, 19C:
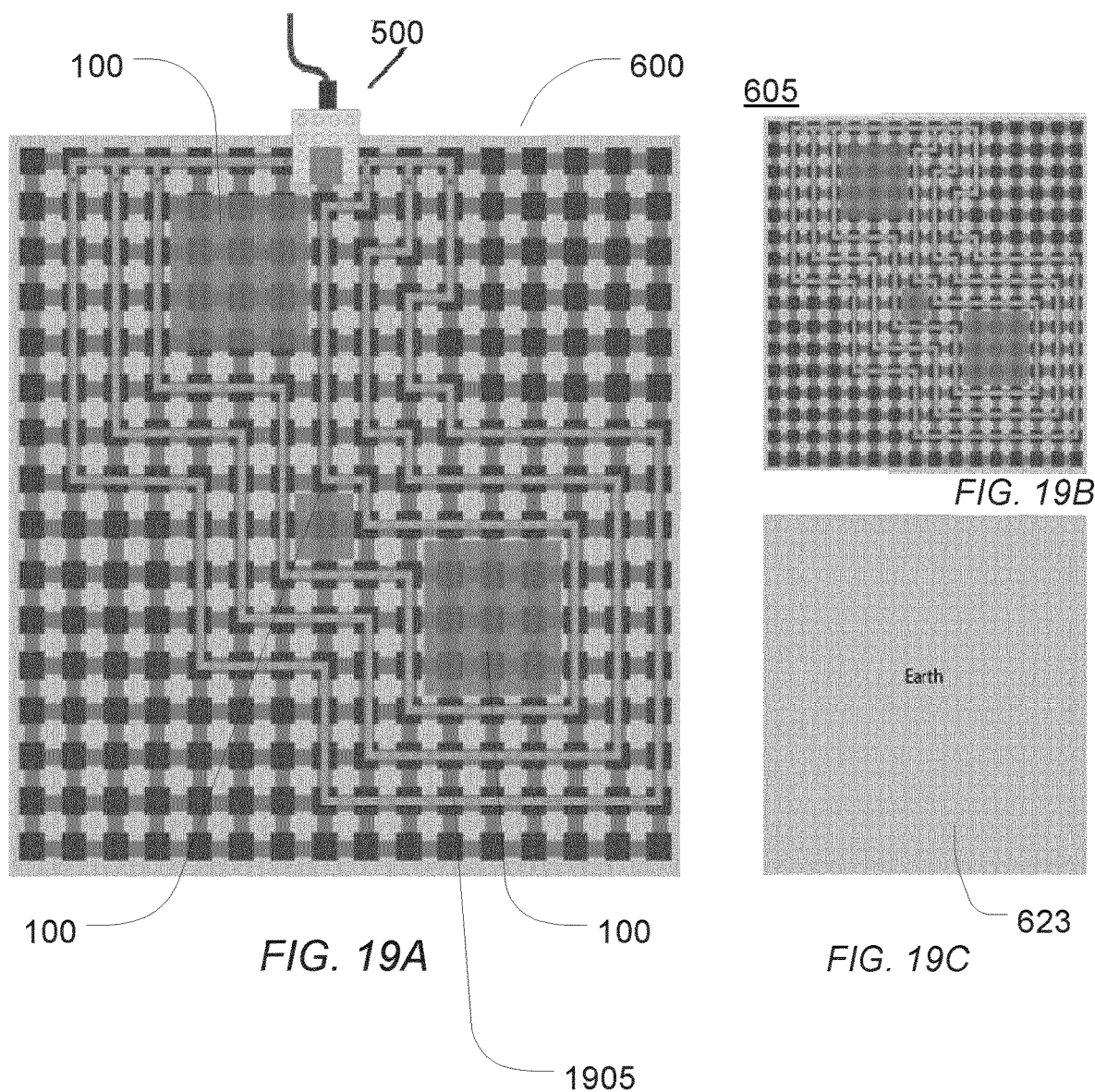
FIGS. 19A-C illustrate an example of operating the energy distribution device of FIGS. 18A-D.

FIGS. 19A-C illustrate an energy source device 500 connected to an energy distribution device 600 as described in connection with FIGS. 18A-D. In the example of FIGS. 19A-C, the energy distribution device 600 is constructed as a layered structure with a ground layer 623, shown in FIG. 19C, and a separated layer implementing the grid 605 of conducting paths and switches. This layer is shown in FIG. 19B.

FIG. 19A illustrates an example of operating the system. In particular, FIG. 19A illustrates how the energy source device can control the switches so as to create customized patterns of current paths for efficiently energizing multiple electronic devices 100 concurrently.

Accordingly, some embodiments of the toy systems shown in FIGS. 16A-D, 17A-C, 18A-D and 19A-C may have the ability to charge individual electronic devices depending on the electronic devices' needs and on overall system load. The electronic devices can communicate between themselves and/or with the energy source device so as to determine an optimal energy transfer configuration for the population of devices given based on parameters such as their position relative to the energy transfer zone, their current charge level, their usage history, and/or the like. To this end, the energy transfer may be duty cycled to allow coexistence with contactless communications. Alternatively, the communications may be performed via a separate channel, e.g. magnetic or radiative. As described in connection with the previous embodiment, the energy source device may determine an optimal routing patter during an initial setup phase where different possible routing patterns are tested and where an optimal routing pattern is selected based on feedback from the electronic devices and/or based on measurements by the energy source device.

Figure 20:
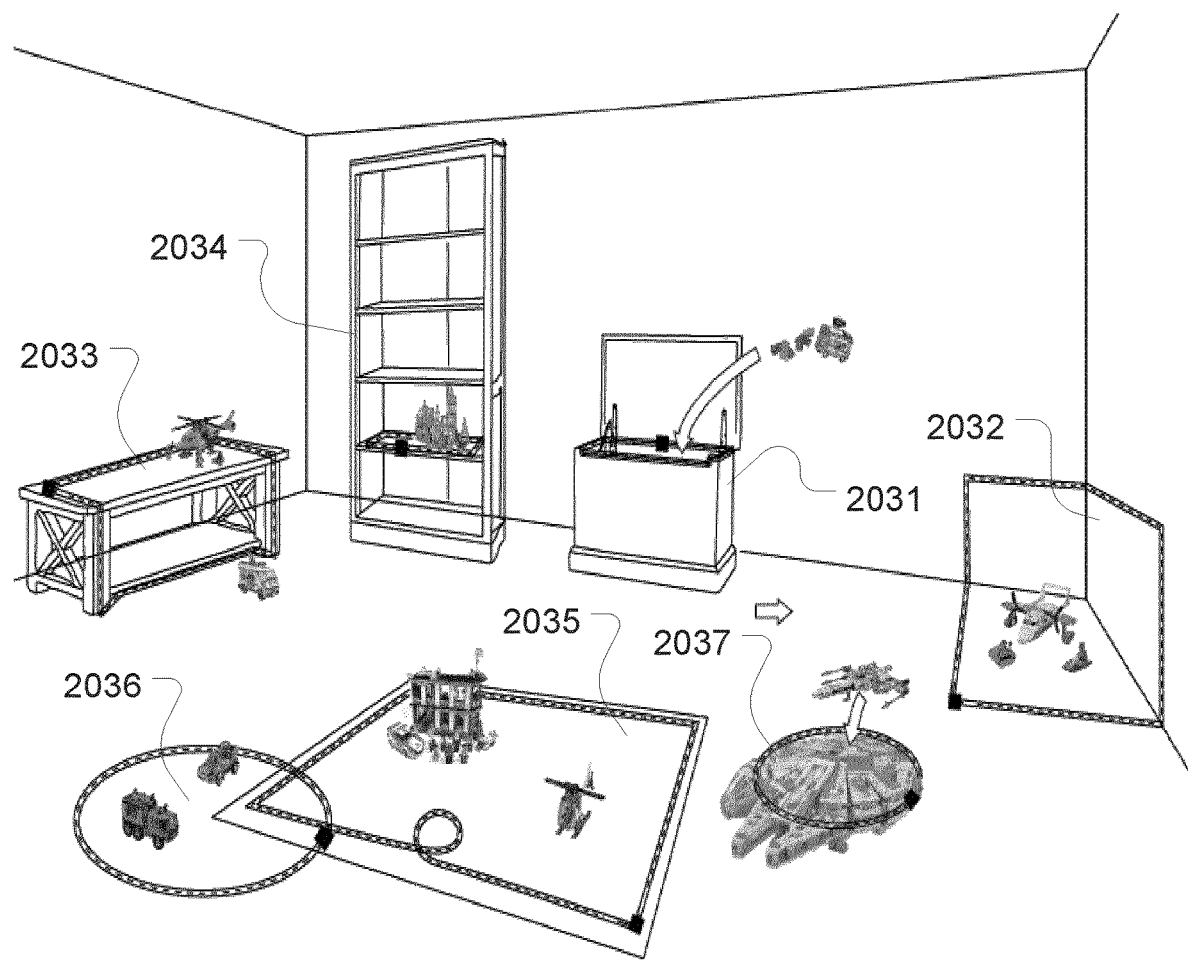
FIG. 20 illustrates various examples of how embodiments of the toy system may be used to create play areas of varying shapes and sizes for energizing electronic toys.

FIG. 20 illustrates various examples of how embodiments of the toy system may be used to create play areas of varying shapes and sizes for energizing electronic toys. As can be from FIG. 20, the various embodiments of toy systems described in connection with the previous Figures may be used to create user-configurable energy transfer zones that may be planar or non-planar, that may have different sizes, include fast energy-transfer hot spots, etc.

For example, an energy distribution device may be attached to a storage container 2031 such that the energy transfer zone partly or completely covers the storage space defined by the container. In this manner, electronic devices may be charged while they are stored in the storage container.

Other examples of energy distribution devices may be attached to walls 2032 so as to create an energy transfer zone in front of the wall.

Yet other examples of energy distribution devices may be integrated into, or attached to, furniture, e.g. as illustrated by system 2033 and 2034. For example, the system 2033 provides an energy transfer zone that extends above and in front of the item of furniture. Similarly, the energy transfer zone of system 2034 extends to one or more shelves above and below the position of the system.

Yet other uses include the creation of energy transfer zones on planar surfaces, e.g. a table top or the floor, e.g. as illustrated by systems 2035 and 2036.

Yet further examples may be embedded into toys, e.g. toy construction models, e.g. as illustrated by system 2037.

Figure 21A:
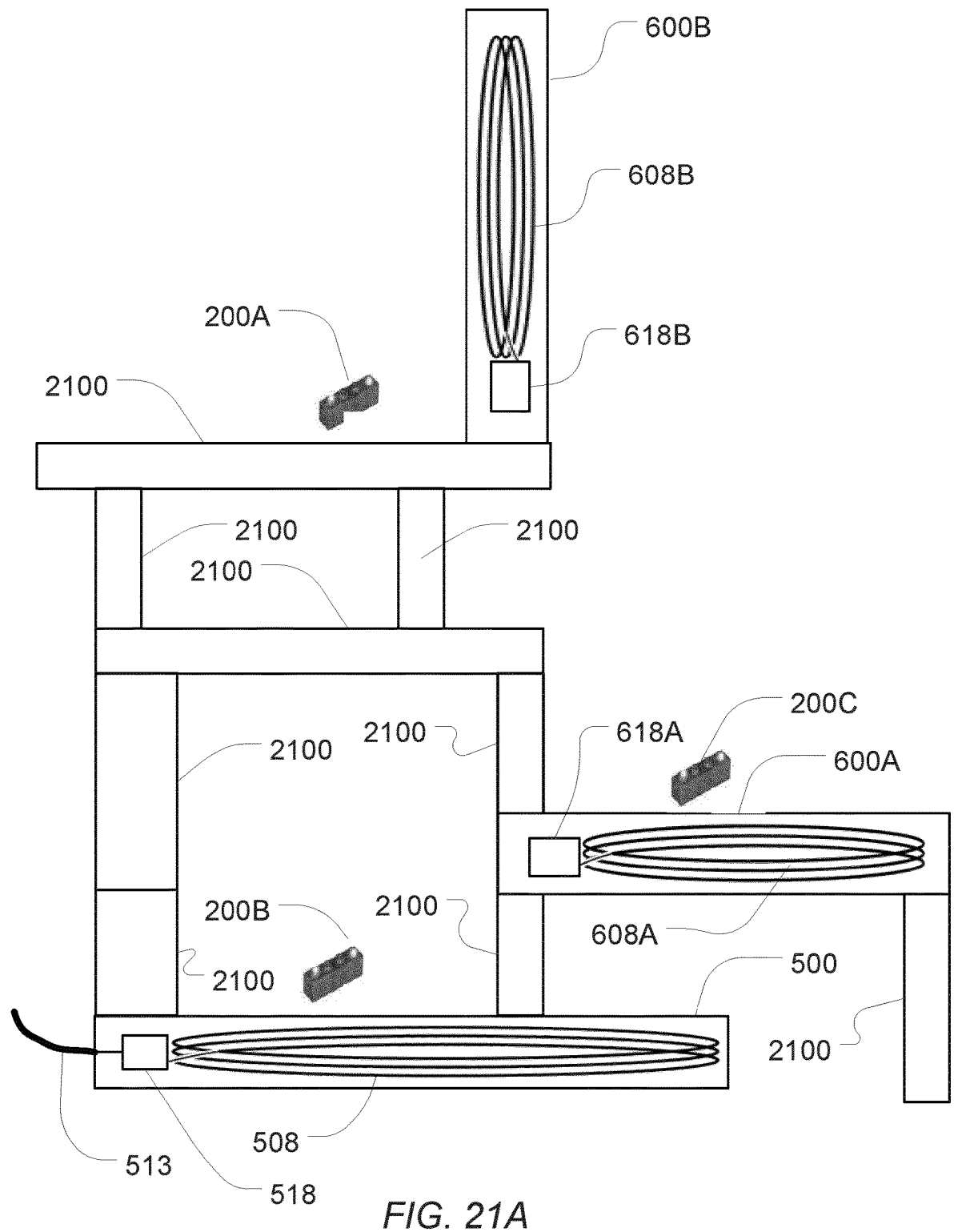
FIGS. 21A-B illustrate examples of a toy construction model comprising elements of an embodiment of an energy transfer system for energizing electronic toys.

FIG. 21A illustrates a toy construction model comprising elements of an embodiment of an energy transfer system for energizing electronic toys. The toy construction model is constructed from a plurality of conventional toy construction elements 2100, an energy source device 500 and two energy distribution devices 600A-B.

The energy source device 500 may be an energy source device as described in connection with FIGS. 5A-B. In particular, energy source device 500 comprises an energy transfer circuit 518, an inductive element 508 and an interface 513 for receiving electric power, e.g. all as described in connection with FIGS. 5A-B. The interface 513 may include a cable that may be permanently or detachably connected to the energy source device, e.g. using a suitable plug-and-socket connection. The inductive element 508 may be an internal element comprised in the housing of the energy source device. Energy source device 500 may be formed as a plate or mat that comprises coupling members for attaching toy construction elements of the toy construction system. Energy source device is operable to provide an energy transfer zone for transferring energy to one or more electronic toy construction elements 500B. In the example of FIG. 21A, only a single electronic toy construction element is shown to be positioned in an energy transfer zone of energy source device 500. It will be appreciated, however, that more than one electronic toy construction elements may concurrently be placed in the energy transfer zone of energy source device 500. Energy source device 500 is further operable to energize one or both of the energy distribution devices 600A-B, e.g. by via near field magnetic resonant coupling.

Each of the energy distribution devices 600A-B may thus receive energy from energy distribution device 500, e.g. by near field magnetic resonant coupling, e.g. as described in US 2010/0127660. The energy distribution devices 600A-B may define respective energy transfer zones and be operable to transfer the received energy to one or more electronic toy construction elements 500A and 500C positioned in their respective energy transfer zones. To this end, each of energy distribution devices may include a suitable energy transfer circuit 618A-B, respectively, and an inductive element 608A-B, respectively. Each of the energy distribution devices 600A-B may be a plate or other type of toy construction element, or a modular element, e.g. as described in connection with FIG. 10 or 14.

It will be appreciated that other examples of toy construction models may comprise a different number of some or each of the above elements. Moreover, while a specific example of a spatial structure is shown in FIG. 21, it will be appreciated that the user may construct many different spatial structures from embodiments of a toy construction system described herein.

Electronic toy construction elements 200A-C may be detachably attached to the toy construction model or simply positioned on or otherwise proximate to the toy construction model and, in particular, in an energy transfer zone of one of the energy source device 500 or energy distribution devices 600A-B.

While shown as individual toy construction elements in FIG. 21A, it will be appreciated that toy construction models including two or more electronic toy construction elements may also be positioned in one of the energy transfer zones defined by the toy construction model. It will further be appreciated that other types of electronic devices may also be charged or powered by placing them in the energy transfer zone defined by the toy construction model.

Figure 21B:
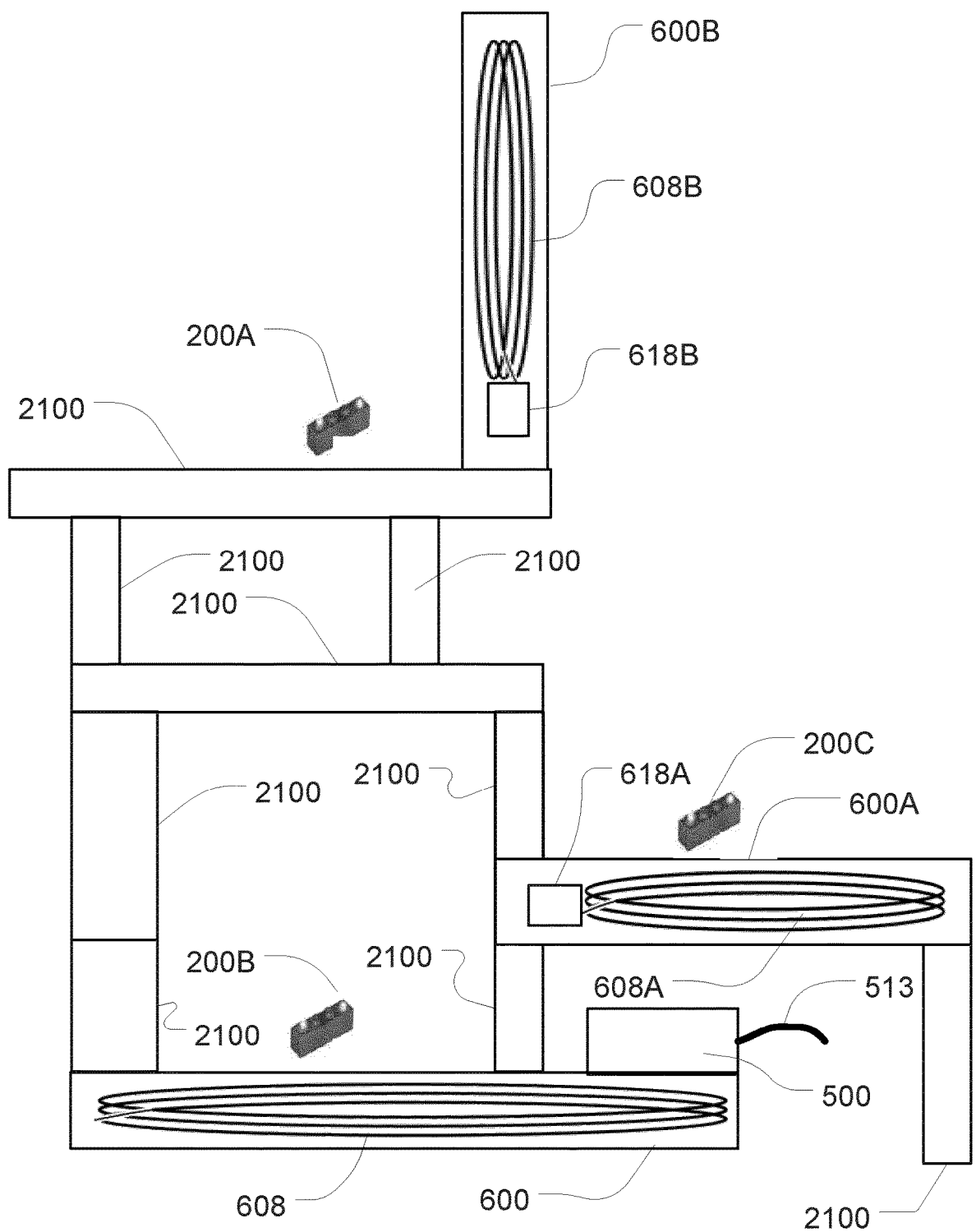

FIG. 21B shows another example of a toy construction model comprising elements of an embodiment of an energy transfer system for energizing electronic toys. The toy construction model of FIG. 21B is similar to the toy construction model of FIG. 21A, except that energy source device 500 is shown attached to an energy distribution device 600, e.g. as described in connection with any of the FIG. 12-15 or 16A.

In the embodiments of FIGS. 21A-B and/or in other embodiments, the energy source device and/or one or more of the energy distribution devices may detect relative position and/or orientation information of the electronic toy construction elements relative to the energy source device and/or relative to one or more of the energy distribution devices. Based on this information, the energy source device and/or one or more of the energy distribution devices may control their respective energy transfer circuits for activating selected ones of the energy transfer zones defines in respect of the toy construction model.

Accordingly, the energy source device and/or one or more of the energy distribution devices may be configured to detect the relative distances (and/or another suitable relative position coordinate) and/or relative orientations of one or more of the electronic toy construction elements. The position and orientation detection may be performed in a number of ways, e.g. by utilizing one or more conductive loops of the energy source device or energy distribution device, respectively, and corresponding inductive elements of the electronic toy construction elements. Alternatively or additionally, the position and orientation detection may utilize a magnetometer for measuring the geomagnetic field, and/or the like. To this end, each energy source device, each electronic toy construction element and, optionally, each energy distribution device may include a magnetometer. An example of a process for detection of the relative distance and orientations is described in co-pending international patent application no. PCT/EP2019/084779, the entire contents of which are hereby included herein by reference.

The toy system may thus be configured to selectively energize the conductive loops of selected respective ones of the energy source device and the energy distribution devices, so as to create energy transfer zones at respective locations relative to the toy construction models and/or so as to create energy transfer zones of varying shapes and/or sizes.

Figure 22:
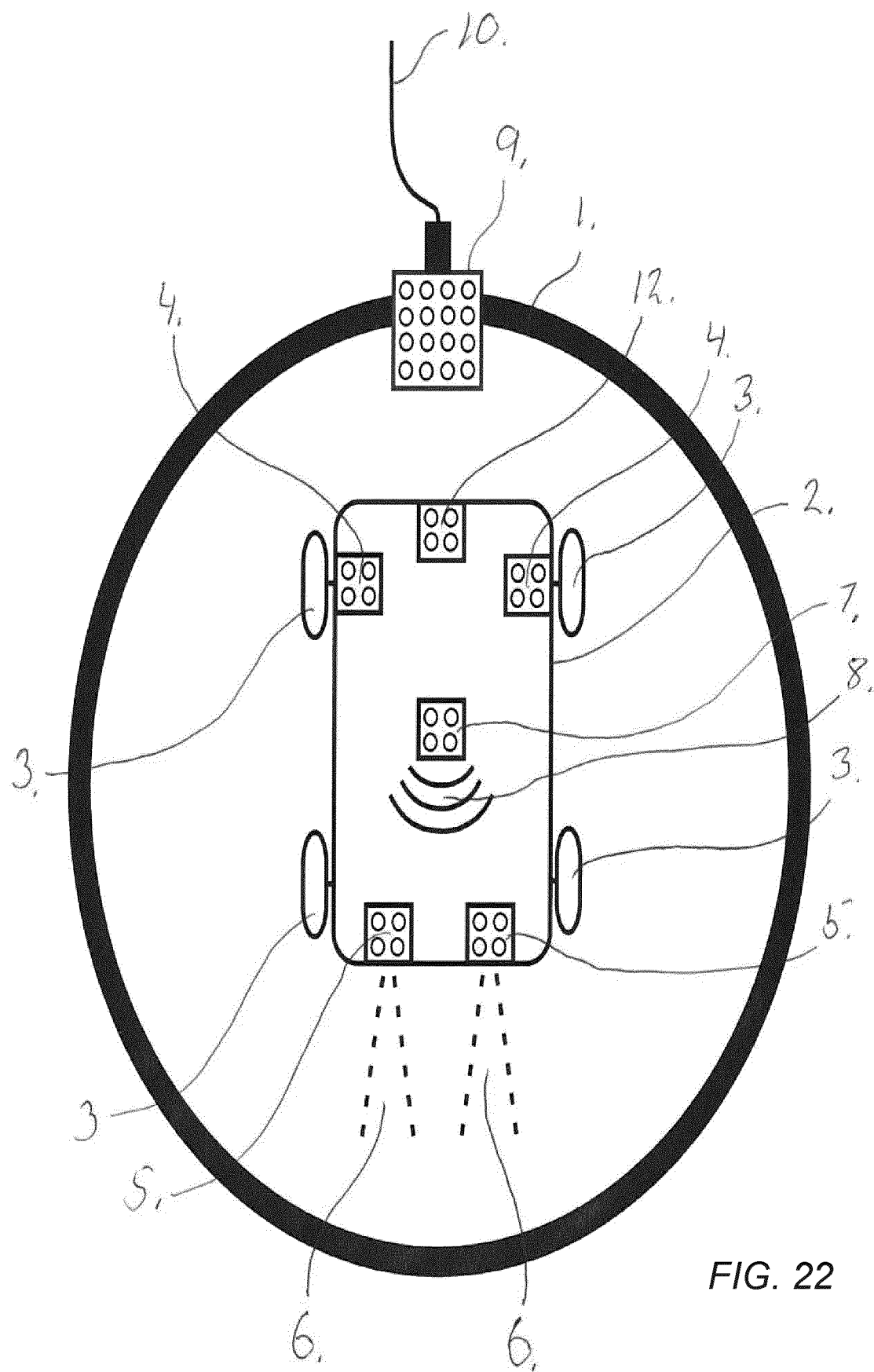
FIG. 22 shows a schematic drawing, showing a top view of one embodiment of a toy according to an embodiment of the present invention.

FIG. 22 shows an embodiment of a wireless inductive charging toy product. A transmitting substantially planar induction coil or loop 1 surrounds a core area upon which the toy body 2 is arranged. The product comprises an electric transformer 9 connected to a suitable power source via a power cord 10, and for providing an alternating current running through the coil or loop 1 which is shaped so that an alternating electromagnetic field is induced having its field lines extending substantially perpendicular to the paper, and thereby forming a magnetic axis perpendicular to the plane of the core area.

The toy body is in this embodiment formed as a toy vehicle having four wheels 3 and comprising a main body 11 with different function parts consisting of two wheel motors 4 each for driving one of the wheels 3, two headlights 5 each with a lighting element such as an LED emitting light beams 6 and a sirene 7 emitting a sound 8. It will be appreciated that the toy body may be shaped in many different ways without departing from the concept of the present invention. Examples of alternative toys may e.g. be a toy house with function parts for emitting light and/or sound, a toy plane with function parts such as motors for driving the wheels of the plane and light or sound emitting function parts or a robot.

In this embodiment the function parts 4, 5 and 7 are all releasably attached to the main body as the main body has a number of sockets 12 for attaching each one of the function parts 4, 5 and 7.

Figure 23:
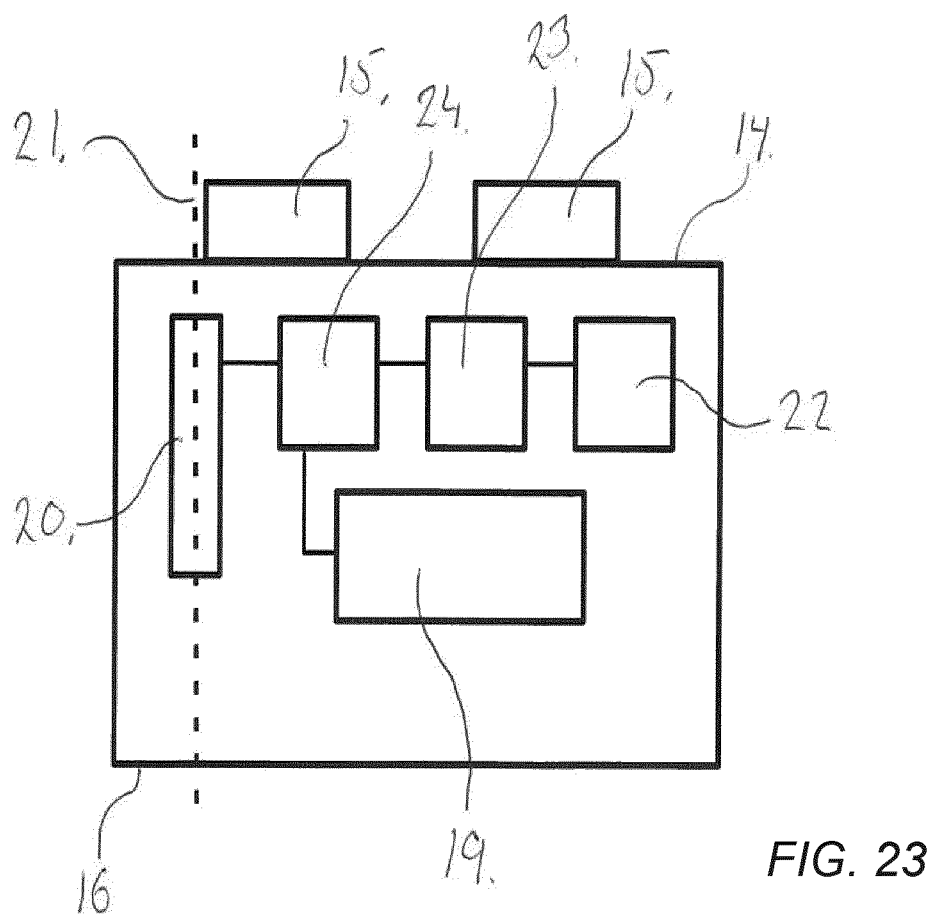
FIG. 23 shows a schematic drawing, showing the internal component of one of the function parts as shown in FIG. 22.

In this relation the toy body 2 may be an assembly (not shown) of several conventional building blocks and function parts 3, 4 and 7 such as shown in FIG. 23, all being shaped as building blocks each having a box shaped body with a planar upper surface 14 with a number of coupling knobs 15 extending perpendicularly from it, and an oppositely arranged lower surface 16 having corresponding coupling sockets extending perpendicularly into the box shaped body from it.

Thereby the building blocks and the function parts 3, 4 and 7 may be assembled by extending the coupling knobs into engagement with the coupling sockets to form various different constructions such as the vehicle as shown in FIG. 1, and the function parts may be arranged at many different places in the finished assembly.

In the embodiment shown in FIG. 23 the components inside each the function part 3, 4 and 7 may comprise a rechargeable battery 19, a receiving induction coil 20 having its magnetic axis 21 extending perpendicular to the 14 upper and the lower 16 surface, a charging or control circuit 24 adapted for charging the rechargeable battery 19 when the receiving induction coil is arranged in a suitable alternating magnetic field, and for providing power from the rechargeable battery 19 to the load 22, comprising e.g. a light or sound emitter or an electric motor.

In this relation the function part may also comprise an electric switch 23 adapted for wireless activation by a suitable external signal to switch the power on and off from the rechargeable battery 19 and to the load 22.

Embodiments of the control circuits of the electronic devices and/or the energy source device described herein can be implemented by means of hardware comprising several distinct elements, and/or at least in part by means of a suitably programmed microprocessor.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A toy system comprising a plurality of toy construction elements, each toy construction element comprising coupling members for detachably interconnecting the toy construction elements with each other to create one or more coherent spatial structures; wherein the plurality of toy construction elements comprises:
   an energy source device comprising a housing and, accommodated within the housing, an energy transfer circuit;
   one or more energy distribution devices, each configured to provide respective one or more external conductive loops extending outside the housing and defining a respective external energy transfer zone in a proximity of the respective one or more external conductive loops;
   wherein the energy source device is configured to be brought into operational connection with one or more of the energy distribution devices; and
   wherein the energy transfer circuit is configured to receive electrical energy from an energy source and, when the energy source device is in operational connection with a first energy distribution device of the one or more energy distribution devices, to energize the one or more external conductive loops of the first energy distribution device so as to create a time-varying electromagnetic field in an external energy transfer zone defined by the first energy distribution device in a proximity of the one or more external conductive loops of the first energy distribution device.

2. A toy system according to claim 1, wherein the energy source device comprises an internal conductive loop accommodated within the housing of the energy source device, the internal conductive loop defining a first energy transfer zone in a proximity of the housing; and wherein the energy transfer circuit is configured to receive electrical energy from an energy source and to energize the internal conductive loop so as to create a time-varying electromagnetic field in the first energy transfer zone.

3. A toy system according to claim 2, wherein the first energy transfer zone is smaller than at least one of the external energy transfer zones; and wherein the energy source device is configured to transfer energy via the first energy transfer zone at a first rate and to cause transfer of energy via said at least one of the external energy transfer zones at a second rate smaller than the first rate.

4. A toy system according to claim 1, wherein at least one of the energy distribution devices is a modular energy distribution device comprising a plurality of mutually interconnectable parts, each part comprising a first coupling member and a second coupling member, and wherein the mutually interconnectable parts are configured to form, when connected in a structure of mutually interconnected parts, an external conductive loop.

5. A toy system according to claim 4, wherein each of the mutually interconnectable parts comprises one or more conductive paths extending between the first and second coupling members, each coupling member being configured to be connected to a mating coupling member of one of the other of the mutually interconnectable parts so as to provide one or more conductive paths each extending across the mutually interconnected parts.

6. A toy system according to claim 5, wherein each mutually interconnected part comprises an elongated body defining a first end and a second end, opposite the first end; and wherein the first coupling member is arranged at the first end and the second coupling member is arranged at the second end of the elongated body.

7. A toy system according to claim 5, wherein the mutually interconnectable parts are configured to be hingedly connected to one or two adjacent ones of the interconnectable parts so as to form an elongated element of hingedly interconnected parts.

8. A toy system according to claim 1, wherein at least one of the energy distribution devices comprises an elongated element configured to be arranged by the user on a surface so as to form a loop structure.

9. A toy system according to claim 1, wherein at least one of the energy distribution devices comprises a carrier sheet having embedded therein one or more conductive paths defining one or more conductive loops.

10. A toy system according to claim 1, wherein the plurality of toy construction elements comprises one or more electronic toy construction elements configured to receive energy from one or more of the energy distribution devices when the electronic toy construction element is positioned in one of the external energy transfer zones.

11. A toy system according to claim 10, wherein each electronic toy construction element comprises a rechargeable energy storage device and an inductive charging circuit for charging the rechargeable energy storage device when the electronic toy construction element is positioned in one of the external energy transfer zones.

12. A toy system according to claim 11, wherein the energy source device and/or one or more of the energy distribution devices is configured to:
  detect a relative position coordinate and/or relative orientations of one or more electronic toy construction elements, relative to the energy source device and/or one or more of the energy distribution devices, respectively; and
  based on the detected relative position coordinate and/or relative orientations, energize selected ones of the external energy transfer zones.

13. A toy system according to claim 1, at least one of the energy distribution devices comprises a conductive loop configured to be selectively brought into a collapsed state and an extended state.

14. A toy system according to claim 1, wherein the energy distribution devices define respective external conductive loops of different shapes and/or sizes.

15. A toy system according to claim 1, comprising a loop housing;
  wherein at least a one of the energy distribution devices comprises a conductive loop configured to be selectively brought into a collapsed state and an extended state; wherein at least a major part of the conductive loop extends outside the loop housing and defines an external energy transfer zone outside the loop housing when the conductive loop is in its extended state; and
  wherein the energy transfer circuit is configured to energize the conductive loop at least when the conductive loop is in its extended state, so as to create a time-varying electromagnetic field in the external energy transfer zone.

16. A toy system comprising an energy source device the energy source device comprising:
  a loop housing;
  a conductive loop configured to be selectively brought into a collapsed state and an extended state; wherein at least a major part of the conductive loop extends inside the loop housing and defines a first energy transfer zone outside the loop housing when the conductive loop is in its collapsed state; wherein at least a major part of the conductive loop extends outside the loop housing and defines an external energy transfer zone outside the loop housing when the conductive loop is in its extended state; and
  an energy transfer circuit, accommodated within the housing, configured to receive electrical energy from an energy source and to energize the conductive loop when the conductive loop is in its collapsed state so as to create a time-varying electromagnetic field in the first energy transfer zone; and to energize the conductive loop when the conductive loop is in its extended state, so as to create a time-varying electromagnetic field in the external energy transfer zone.

17. A toy system according to claim 16, wherein the energy source device comprises a housing including the loop housing, the conductive loop and, accommodated within said housing, the energy transfer circuit.

18. A toy system according to claim 16, wherein the toy system comprises the energy source device and an energy distribution device configured to be operationally connected to the energy source device, the energy source device comprising the energy transfer circuit; and wherein the energy distribution device comprises the loop housing and the conductive loop.

19. A toy system according to claim 16, wherein at least a major part of the conductive loop is accommodated within the loop housing when the conductive loop is in its collapsed state.

20. A toy system according to claim 16, wherein the conductive loop comprises an extended number of turns, when the conductive loop is in the collapsed state and a reduced number of turns, smaller than the extended number of turns, when the conductive loop is in its extended state.

21. A toy system according to claim 16, wherein the energy transfer circuit is configured to energize one or more conductive loops so as to create a time-varying electromagnetic field in a first energy transfer zone and in a second energy transfer zone, larger than the first energy transfer zone; wherein the first and second energy transfer zones are defined by the one or more conductive loops in a proximity of the one or more conductive loops;
  wherein the system comprises a plurality of electronic devices each configured to receive energy when positioned within the first or second energy transfer zone;
  wherein the second energy transfer zone is large enough to accommodate two or more of the plurality of electronic devices for concurrent energy transfer to the two or more electronic devices; wherein the first energy transfer zone is shaped and sized so as to accommodate a smaller number of the electronic devices than the second energy transfer zone; and wherein the energy source device is configured to transfer energy via the first energy transfer zone at a first rate and to transfer energy via the second energy transfer zone at a second rate smaller than the first rate.

22. A toy system according to claim 16, further comprising a plurality of electronic devices each configured to receive energy when positioned within at least one energy transfer zone defined by the toy system; wherein the energy transfer zone is large enough to accommodate two or more of the plurality of electronic devices for concurrent energy transfer to the two or more electronic devices; and
  wherein the energy source device is configured to receive, from one or more of the plurality of electronic devices positioned within the energy transfer zone, data about one or more of the plurality of electronic devices; and energy transfer zone to control the time-varying electromagnetic field based on the received data.

23. A toy system according to claim 16, further comprising:
  a carrier sheet;
  a plurality of conductive paths embedded into the carrier sheet;
  wherein the energy transfer circuit configured to selectively energize a plurality of subsets of the plurality of conductive paths, the plurality of subsets comprising a first subset and a second subset;
  wherein the first subset of conductive paths defines a first energy transfer zone in a proximity of the first subset of conductive paths, and energizing the first subset creates a time-varying electromagnetic field in said first energy transfer zone; and wherein the second subset of conductive paths defines a second energy transfer zone in a proximity of the second subset of conductive paths, and energizing the second subset creates a time-varying electromagnetic field in said second energy transfer zone; the second energy transfer zone being different from the first energy transfer zone.

24. A toy system comprising:

a carrier sheet;

a plurality of conductive paths embedded into the carrier sheet;

an energy transfer circuit configured to receive electrical energy from an energy source and to selectively energize a plurality of subsets of the plurality of conductive paths, the plurality of subsets comprising a first subset and a second subset;

wherein the first subset of conductive paths defines a first energy transfer zone in a proximity of the first subset of conductive paths, and energizing the first subset creates a time-varying electromagnetic field in said first energy transfer zone; and wherein the second subset of conductive paths defines a second energy transfer zone in a proximity of the second subset of conductive paths, and energizing the second subset creates a time-varying electromagnetic field in said second energy transfer zone; the second energy transfer zone being different from the first energy transfer zone.

25. A toy system according to claim 24, wherein each of the conductive paths forms a conductive loop; and wherein a selected subset consists of one or more conductive loops.

26. A toy system according to claim 24, wherein the conductive paths form a grid of mutually crossing conductive paths.

27. A toy system according to claim 24, further comprising an energy source device configured to obtain information about one or more electronic devices positioned in a proximity of the carrier sheet, to select a subset of the conductive paths based on the obtained information and to energize the selected subset of conductive paths.

28. A toy system according to claim 24, further comprising one or more non-electronic toy construction elements.

* * * * *